(12) United States Patent
Al-Sukhni et al.

(10) Patent No.: US 7,506,105 B2
(45) Date of Patent: Mar. 17, 2009

(54) PREFETCHING USING HASHED PROGRAM COUNTER

(75) Inventors: Hassan F. Al-Sukhni, Austin, TX (US); James C. Holt, Austin, TX (US); Matt B. Smittle, Allen, TX (US); Michael D. Snyder, Austin, TX (US); Brian C. Grayson, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 340 days.

(21) Appl. No.: 11/120,288

(22) Filed: May 2, 2005

(65) Prior Publication Data

US 2006/0248281 A1 Nov. 2, 2006

(51) Int. Cl.
*G06F 12/06* (2006.01)
*G06F 9/34* (2006.01)

(52) U.S. Cl. .................. 711/137; 711/216; 711/217; 712/207

(58) Field of Classification Search ................ 711/169, 711/137, 212, 216, 217, 218
See application file for complete search history.

(56) References Cited

U.S. PATENT DOCUMENTS

| | | | |
|---|---|---|---|
| 5,442,766 A | 8/1995 | Chu | |
| 5,694,568 A | 12/1997 | Harrison, III et al. | |
| 5,734,881 A | 3/1998 | White | |
| 5,796,971 A | 8/1998 | Emberson | |
| 6,055,621 A | 4/2000 | Puzak | |
| 6,055,650 A | 4/2000 | Christie | |
| 6,157,993 A | 12/2000 | Lewchuk | |
| 6,317,810 B1 | 11/2001 | Lopez-Aguado et al. | |
| 6,430,680 B1 | 8/2002 | Burky et al. | |
| 6,560,693 B1 | 5/2003 | Puzak | |
| 6,571,318 B1 | 5/2003 | Sander et al. | |
| 6,665,776 B2 | 12/2003 | Jouppi et al. | |
| 6,832,296 B2 | 12/2004 | Hooker | |
| 6,976,147 B1 | 12/2005 | Isaac | |
| 7,143,272 B2 * | 11/2006 | Wilkerson et al. | 712/240 |
| 7,177,985 B1 * | 2/2007 | Diefendorff | 711/137 |

(Continued)

OTHER PUBLICATIONS

Kyle Nesbit and James E. Smith, "Data Cache Prefetching Using a Global History Buffer," 10th International Symposium on High Performance Computer Architecture, pp. 96-105, Feb. 2004; available from http://doi.ieeecomputersociety.org/10.1109/HPCA.2004.10030, accessed May 2007.*

(Continued)

*Primary Examiner*—Matt Kim
*Assistant Examiner*—Hal Schnee
(74) *Attorney, Agent, or Firm*—David G. Dolezal; Susan C. Hill

(57) ABSTRACT

Generating a hashed value of the program counter in a data processing system. The hashed value can be used for prefetching in the data processing system. In some examples, the hashed value is used to identify whether a load instruction associated with the hashed value has an address that is part of a strided stream in an address stream. In some examples, the hashed value is a subset of bits of the bits of the program counter. In other examples, the hashed value may be derived in other ways from the program counter.

25 Claims, 14 Drawing Sheets

U.S. PATENT DOCUMENTS

| | | | | |
|---|---|---|---|---|
| 7,343,474 | B1* | 3/2008 | Jordan et al. | 712/214 |
| 2003/0105940 | A1 | 6/2003 | Cooksey | |
| 2003/0126371 | A1 | 7/2003 | Venkatraman | |
| 2003/0159019 | A1* | 8/2003 | Oldfield et al. | 712/207 |
| 2003/0172259 | A1* | 9/2003 | Mori et al. | 712/234 |
| 2004/0215921 | A1* | 10/2004 | Alexander et al. | 711/216 |
| 2005/0268075 | A1* | 12/2005 | Caprioli et al. | 712/239 |
| 2005/0283593 | A1* | 12/2005 | Vasekin et al. | 712/240 |
| 2006/0095750 | A1* | 5/2006 | Nye et al. | 712/240 |

OTHER PUBLICATIONS

John L. Hennessy and David A. Patterson, "Computer Architecture, a Quantitative Approach," San Matteo, CA: Morgan Kauffman Publishers, Inc., 1990, pp. 252-253.*

Kyle Nesbit and James E. Smith, "Data Cache Prefetching Using a Global History Buffer," pp. 90-97. IEEE Computer Society, Jan.-Feb. 2005.*

Jouppi, "Improving Direct-Mapped Cache Performance by the Addition of a Small Fully-Associative Cache and Prefetch Buffers" In IEEE proceedings of the 17th International Symposium on Computer Architecture, May 1990 pp. 388-397.

Farkas et al, "Memory-System Design Considerations for Dynamically-Scheduled Processors" in IEEE proceedings of 24th International Symposium on Computer Architecture, Jun. 1997.

Office Action dated Feb. 5, 2008 regarding U.S. Appl. No. 11/120,287, First Named Inventor, Hassan F. Al-Sukhni.

* cited by examiner

PREFETCHING USING HASHED PROGRAM COUNTER

BACKGROUND OF THE INVENTION

Related Cases

This application is related to the application entitled "Prefetching Across A Page Boundary," U.S. patent application Ser. No. 11/120,272, U.S. patent application Publication No. 2006-0248279 A1, filed on May 2, 2005, now abandoned, having inventors Hassan F. Al-Sukhni, Brian C. Grayson, James C. Holt, Matt B. Smittle, and Michael D. Snyder as inventors, having a common assignee, and having the same filing date, all of which is incorporated by reference in its entirety.

This application is related to the application entitled "Prefetch Address Generation Implementing Multiple Confidence Levels", U.S. patent application Ser. No. 11/120,287, U.S. patent application Publication No. 2006-0248280 A1, filed on May 2, 2005, now abandoned, having inventors Hassan F. Al-Sukhni, Brian C. Grayson, James C. Holt, Matt B. Smittle, and Michael D. Snyder as inventors, having a common assignee, and having the same filing date, all of which is incorporated by reference in its entirety.

1. Field of the Invention

This invention relates in general to data processing systems and more specifically to prefetching in a data processing system.

2. Description of the Related Art

Data prefetching can be used to overcome memory latency in data processing systems. One type of data prefetching is stride prefetching. Stride prefetching is based on detecting regular access patterns in the data address stream. Prefetch addresses can be generated based on those detected strides.

Some data processing operations may include multiple strided streams in a data address stream with each strided stream exhibiting a regular pattern of access to a memory. Some prior art systems for data prefetch stride detection have utilized the program counter (PC) value for identifying multiple strided streams within a data address stream.

One problem with using a PC value for stride detection is that the PC value for an instruction must be carried at least through part of the processor pipeline. As the processor pipeline becomes deeper and wider, the cost (e.g. in terms of power and area) of carrying the PC value for each instruction in the pipeline increases.

What is needed is an improved system for prefetching in a data processing system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Strides in the data address stream of a data processing system can be detected using a hashed value of the program counter (PC). The program counter indicates the next (or current in some embodiments) instruction of a program that a processor is fetching e.g. in a fetch stage (e.g. stage 102 of FIG. 1) of a processor pipeline. A program counter represents an address of a storage circuit of a data processing system where the instruction associated with the program counter is stored. For example, the program counter may represent an address in a memory (e.g. 221) storing the next (or current) instruction to be operated on by a processor pipeline. A program counter may also be referred to by other names such as e.g. an instruction pointer (IP), or a next instruction address (NIA). A hashed value of the program counter is a value derived from the program counter and has fewer bits than the program counter. In some embodiments, using a hashed value of the program counter may allow for the detection of a stride in a data address stream while unitizing a lesser number of bits than the program counter for stride detection.

Figure 1:
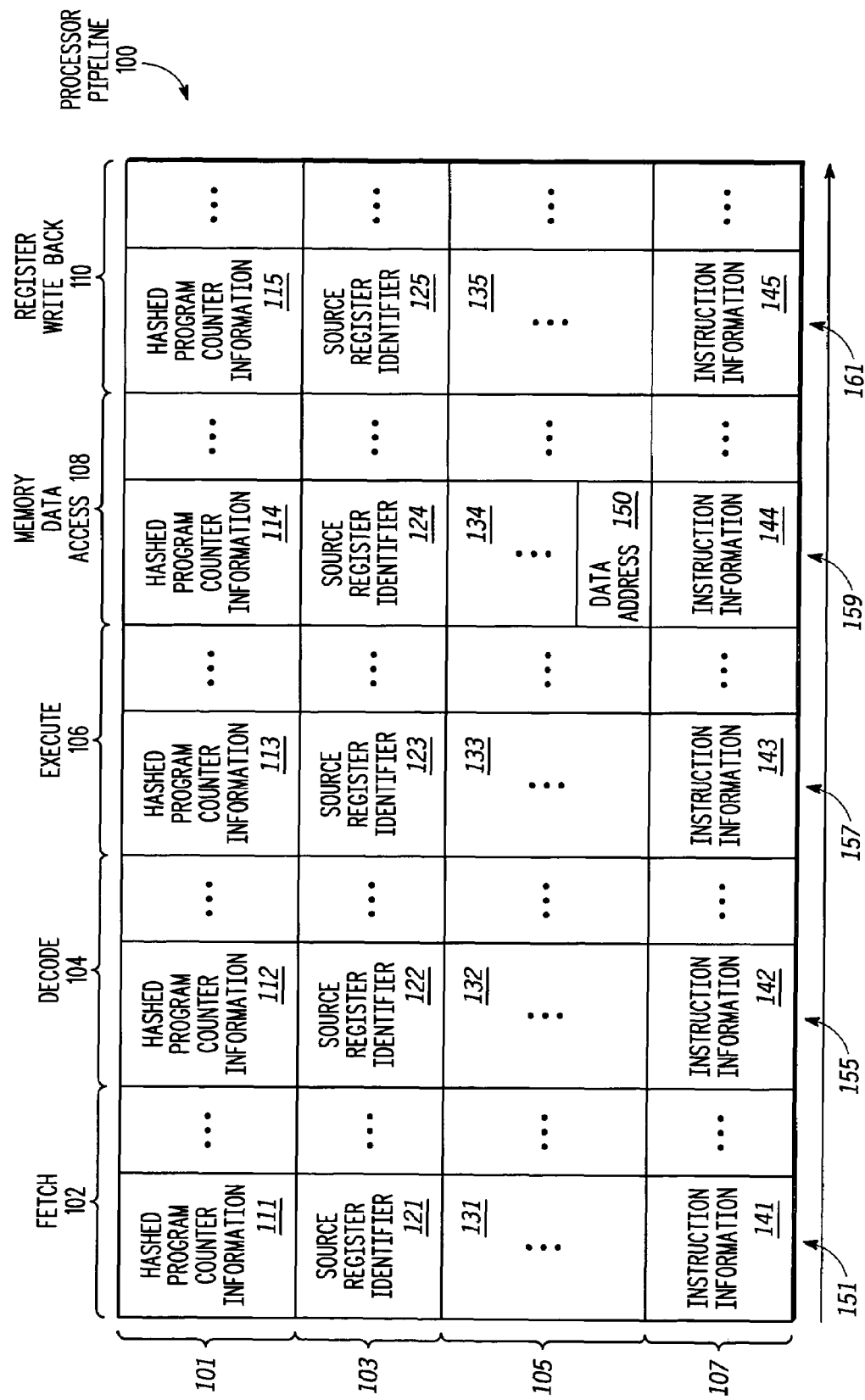
FIG. 1 is a block diagram of a processor pipeline according to one embodiment of the present invention.

FIG. 1 shows one example of a processor pipeline for a data processing system according to one embodiment of the present invention. In the embodiment shown, processor pipeline 100 includes a set of pipeline instructions at various stages of the processor pipeline. In the embodiment shown, processor pipeline 100 includes a fetch stage 102, a decode stage 104, an execute stage 106, a memory data access stage 108, and a register write back stage 110. The various stages are implemented by circuitry of a processor. In other embodiments, a processor pipeline may include other stages such as e.g. register rename stage. Also, each of the stages shown in FIG. 1 each may include multiple stages. Some processors may implement instruction and data accesses in the same stage.

Each stage in FIG. 1 includes at least one instruction. However, during processing operations, some stages may not include an instruction at a particular time, e.g. pipeline stalls. In FIG. 1, fetch stage 102 includes instruction 151, decode stage 104 includes instruction 155, execute stage 106 includes instruction 157, memory data access stage 108 includes instruction 159, and register write back stage includes instruction 161.

Each instruction includes multiple information fields that may be processed during each stage. In the embodiment shown, the instructions include a hashed program counter information field 101, a source register identifier field 103, an instruction field 105, and instruction information field 107 (e.g. instruction type, destination register).

The different fields of each instruction of a pipeline stage may be stored in registers of the circuitry implementing that stage. Accordingly, as the instructions flow through the data pipeline, the information in each field would be passed from registers of one stage to registers of another stage.

In the memory data access stage 108, data address information 150 is generated. This information is utilized to access data for further processing operations.

Because a hashed value of the program counter and not the entire program counter is used for stride detection, the amount of information required to flow through a processor pipeline may be reduced. In some embodiments, reducing the amount of information allows for a reduction in circuitry (e.g. area and complexity of an integrated circuit) as well as power needed for processing operations. In some embodiments, some of the information of each instruction may not be needed to propagate through the entire pipeline.

Figure 2:
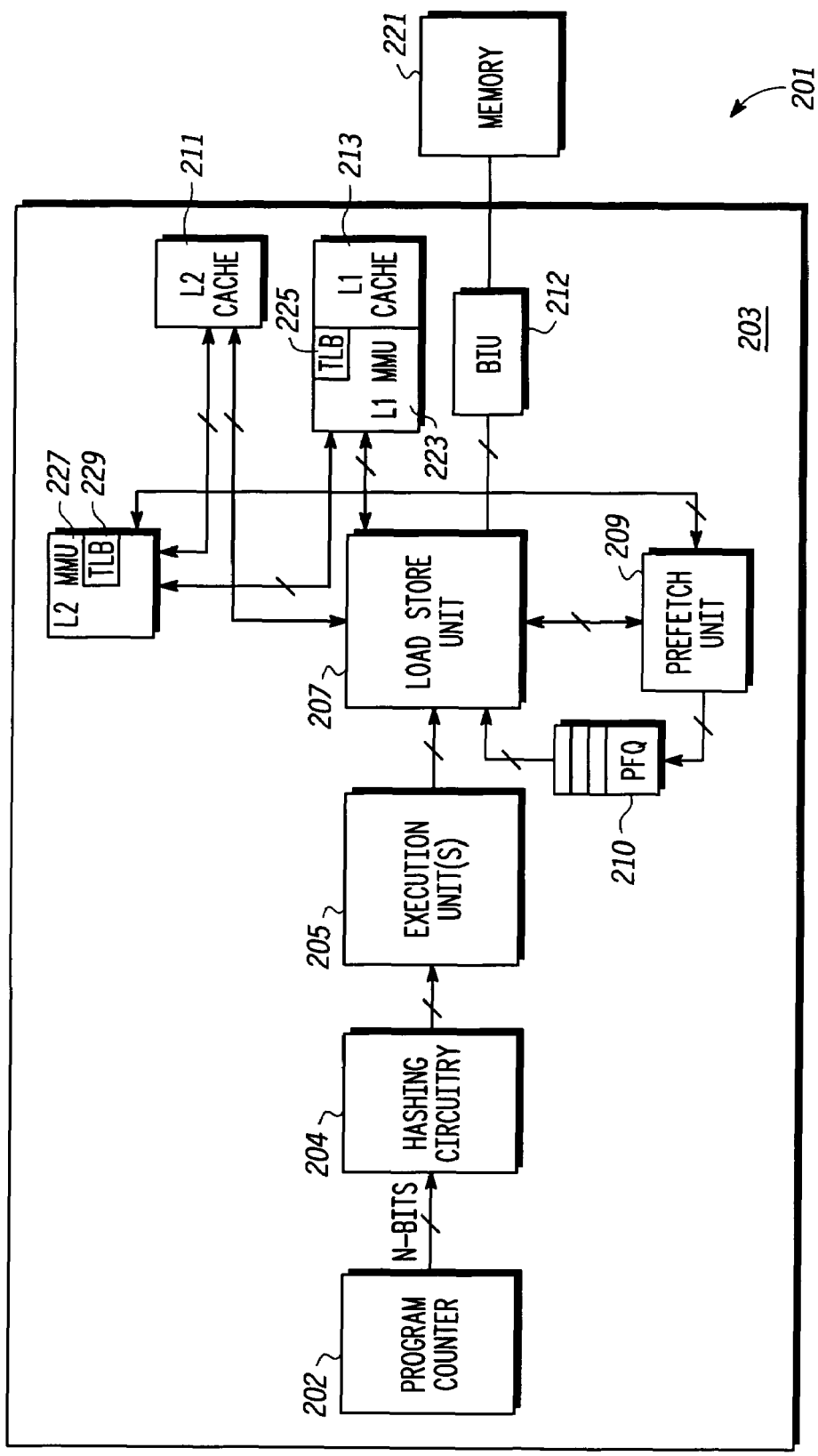
FIG. 2 is a block diagram of a data processing system according to one embodiment of the present invention.

FIG. 2 is a block diagram of a data processing system according to one embodiment of the present invention. Processing system 201 includes a processor 203 and memory 221. In one embodiment, processor 203 is implemented on an integrated circuit and memory 221 is implemented in one or more separate integrated circuits. However, other data processing systems according to the present invention may have other configurations e.g. such as the data processing system 201 implemented on one integrated circuit. In one embodiment, processing system 201 is utilized as a system processor in a computer system (e.g. server, desktop, laptop, PDA, cellular phone, or a computer system implemented in another apparatus e.g. such as control system for an automobile).

Processor 203 includes a load store unit 207, L2 cache 211, L1 cache 213, prefetch unit 209, and a bus interface unit (BIU) 212 for interfacing with memory 221. Processor 203 also includes an L2 memory management unit (MMU) 227 with a translation lookaside buffer (TLB) 229 and an L1 MMU 223 with a TLB 225. In one embodiment, MMU 223 is a subset of MMU 227. In one embodiment, MMU 227 is a multilevel memory management unit. Processor 203 also includes execution units 205 e.g. floating point units, integer and arithmetic logic units, instruction fetch units, and branch prediction units.

Processor 203 implements a processor pipeline with execution units 205 and with load store unit 207. In one embodiment the memory data access stage 108 is implemented with load store unit 207. Processor 203 also implements the pipeline with a program counter circuit 202 and PC hashing circuit 204. Program counter circuit 202 generates the program counter and hashing circuit 204 generates a hashed value of the program counter.

In one embodiment, processor 203 is a 64 bit processor, but may have other instruction sizes (e.g. 8, 16, 32) in other embodiments. Also in other embodiments, processor 203 may include other circuitry not shown and/or have other configurations.

During processor operations, load store unit 207 generates a data address information 150 for the requested data for an instruction. Each generated address makes up an address of the data address stream. In one embodiment, load store unit 207 accesses the L1 cache 213 to determine if the data is present. If the data is not present in the L1 cache 213, load store unit 207 will request the data from the L2 cache (or other cache levels in other embodiments). If the data is not present in any of the caches, then load store unit 207 requests the data from memory 221 via BIU 212. If the data is not present in memory 221, then a request for the data from another memory (e.g. hard disk drive, CD drive etc.) is generated e.g. via an exception or interrupt. Load store unit 207 may perform other operations in data retrieval not described herein. The accessed data is then forwarded to the execution units and/or written to the appropriate cache.

Accessing data from memory 221 (and the L2 cache) requires multiple cycles as compared to accessing data from L1 cache. Accordingly, it may be desirable to prefetch the data. In one embodiment, prefetching includes predicting the address of the data to be accessed in subsequent processing operations of the processor pipeline and retrieving such data before needed for those processing operations. In some embodiments, the retrieved data is written to L1 cache 213.

An example of processor operations where data prefetching may be advantageous is for processing operations that generate strided streams in the data address stream. A strided stream is a group of data accesses in the data address stream that have addresses which are separated by a constant difference (stride). One example of a strided stream occurs where a loop, with a specific load instruction, is performed multiple times where data is obtained from multiple memory locations each separated by a constant address difference. Some processor operations may generate multiple strided streams within the data address stream. Strided streams may also be generated by other control constructs e.g. recursive function calls.

Furthermore, these strided streams may be intermixed (aliased) within the data address stream wherein memory pattern recognition of the different strided streams becomes difficult. For example a program loop may include different access instructions to different memory areas with each iteration of the loop. Each access instruction would generate its own stride pattern. During the processing of a loop with three different strided streams, an access of strided stream 1 would be performed, an access of strided stream 2 would be performed, and then an access of strided stream 3 would be performed. On a second iteration of the loop, a second access of strided stream 1 would be performed, a second access of strided stream 2 would be performed, and then a second access of strided stream 3 would be performed.

In one embodiment, prefetch unit 209 utilizes a hashed value of the program counter to determine if a data access was generated by an instruction that has been generating a particular strided stream. In the case where a loop contains different data accesses, prefetch unit 209 uses the hashed value to differentiate between the different load instructions and then detect if there is a strided pattern in the stream.

In some processing operations, different load instructions (each with its own program counter value) generate different strided streams. Accordingly, using the hashed value to differentiate among different instructions allows for prefetch unit 209 to differentiate among different strided streams generated by different instructions.

However, it has been discovered that not all of the bits of the program counter may be needed to differentiate among likely instructions which generate strided streams in a data address stream.

For example, the program instructions that generate accesses of different strided streams may be most likely to have program counter values that are separated by differences in bits of a certain location (e.g. the least significant bits) of each other such that the other bits (e.g. the most significant bits) may convey redundant information.

In one embodiment where the program counter value includes 64 bits, bits 2-5 (with bit 0 being the least significant bit) would be examined to differentiate the different instructions. With this embodiment, the hashed value of the program counter would be bits 2-5 of the program counter. In other embodiments, the hashed value would include other bits of the program counter. In other embodiments, the hashed value would be generated from the program counter by different techniques. For example, in some embodiments, the hashed value would be other bits (either consecutive bits or non consecutive bits) of the program counter. For example, the hashed value could be bits 0-10, bits 0, 2, 4, 6, 8, 10, 12, or bits 5, 10, 15,20,25,30.

In other embodiments, logical operations may be performed on the bits of the program counter to obtain the hashed value. For example, certain bits of the program counter may be exclusive OR'd (XOR'd) (or be processed by other logical or arithmetic operations e.g. shifting, complementing) to obtain a hashed value. In other embodiments, the hashed value may include some bits of the program counter and bits derived by logical or arithmetical operations of other bits of the program counter.

In the embodiment shown, prefetch unit 209 generates prefetch addresses which are provided to prefetch queue 210. LSU 207 processes the prefetch addresses to obtain the data of the prefetch address. In one embodiment, LSU 207 accesses L2 cache 211 to determine if the data is present. If the data is not present, LSU 207 requests the data from memory 221. These prefetches may be processed on a lower priority than data fetches for pipeline operations in some embodiments.

Figure 3:
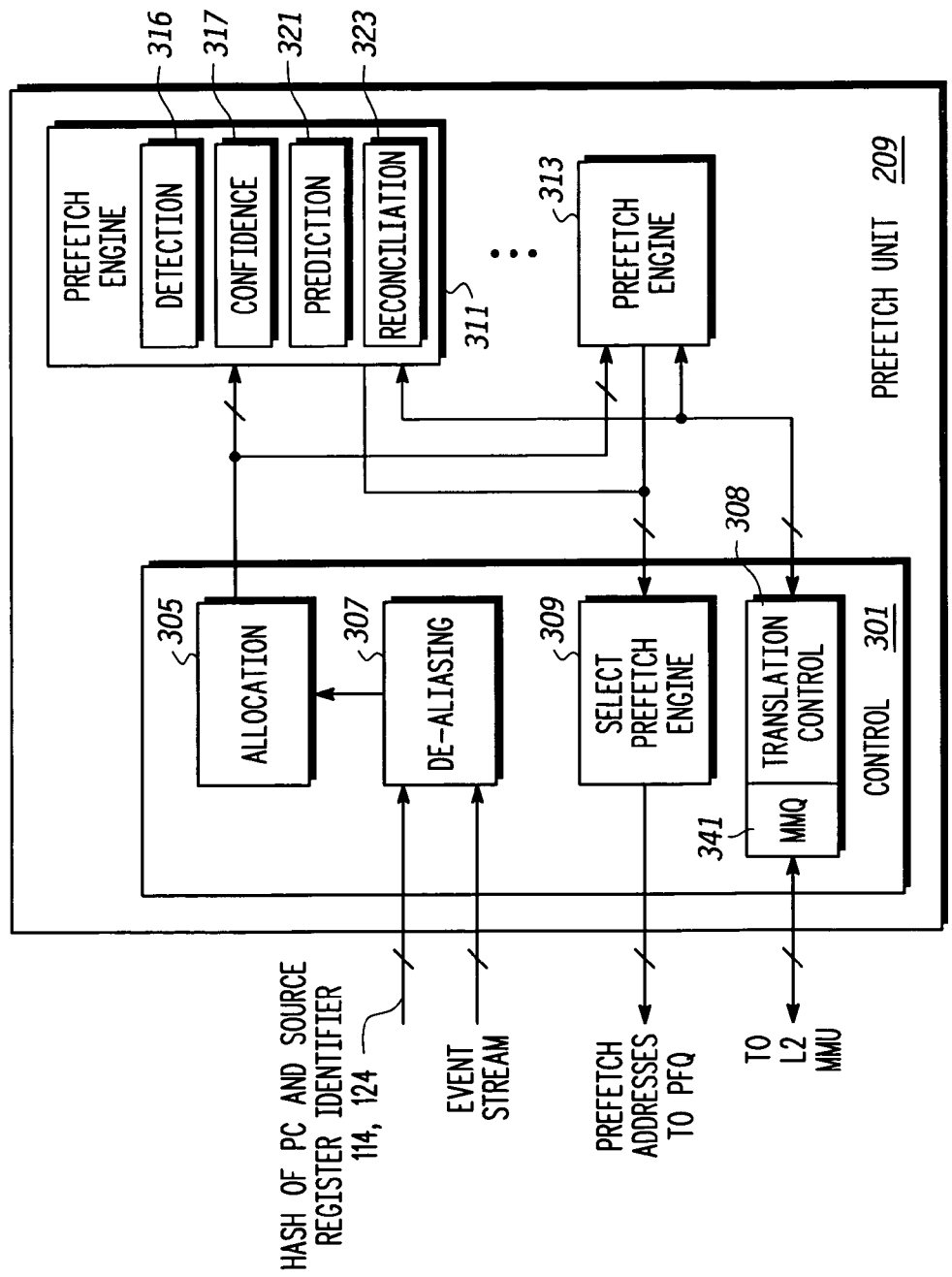
FIG. 3 is a block diagram of a data prefetch unit of a data processing system according to one embodiment of the present invention.

FIG. 3 is a block diagram of one embodiment of prefetch unit 209 according to one embodiment of the present invention. Prefetch unit 209 includes a control unit 301 and a plurality of prefetch engines (with prefetch engines 311 and 313 shown in FIG. 3). Each prefetch engine is unitized to generate prefetch addresses for a single strided stream. Control unit 301 includes a de-aliasing circuit 307 that utilizes the hashed value of the program counter to determine which instruction generated the data address for differentiation of the data accesses.

In the embodiment shown, de-aliasing circuit 307 also utilizes the source register identifier for differentiating among the instructions having the same hashed value. In one embodiment, a pipeline instruction includes an operation code (op code), a source register identifier (e.g. 103), offset or offset register identifier, destination register identifier, and other fields. Because different instructions may have the same hashed value, the source register identifier may be used in further differentiating the instructions. Typically, different data access instructions of different loops would utilize different source address registers. Accordingly, utilizing additional information of an instruction in addition to the hashed value provides further accuracy in differentiating instructions where the possibility exists that two instructions have the same hashed value. In other embodiments, other information in a pipeline instruction e.g. the destination register identifier, the offset, the operation type, or any other pipeline information may be used. Such information may be used without the penalty of increasing the pipeline width where the information is used for other processes of the data processing operation. In other embodiments, the stream identifier may be formed with other information.

In the embodiment shown, de-aliasing circuit 307 receives a hashed value from LSU 207. In one embodiment, de-aliasing circuit 307 generates a stream identifier based on the hashed value and the source register identifier. This stream identifier is provided to the allocation circuit 305. Circuit 305 attempts to allocate each stream identifier to one prefetch engine (e.g. 311, 313). See e.g. the discussion below regarding FIG. 4.

De-aliasing circuit 307 also receives an event stream from LSU 207. The event stream includes data access information of the LSU 207 and information associated with the access information including the data address of the event and the type of the event. Examples of the type of events that are conveyed in the event stream include data cache misses, data cache hits, prefetch evicts, and load fold on prefetches. In the case of prefetch evicts and load fold on prefetch, the ID for the prefetch engine that issued the prefetch is included in the event stream.

Each prefetch engine (e.g. 311) attempts to detect a strided stream in the data addresses associated with its allocated stream identifier. In one embodiment, each prefetch engine includes a detection circuit 316 that detects strided patterns by comparing consecutive data access addresses associated with the allocated stream identifier. The prediction circuit 321, generates predicted addresses of future data accesses of the strided stream based on the detected stride from detection circuit 316 and the current data address. The predictions are provided to the select prefetch engine circuit 309, wherein the predictions are provided to LSU 207 via PFQ 210. LSU 207 uses the predictions to prefetch the data and store the data in L1 cache 213. In other embodiments, the prefetched data may be stored in other memory locations or temporary buffers.

In the embodiment shown, each prefetch engine includes a confidence circuit 317 that generates a confidence value for the stream identifier being tracked by the prefetch engine. In one embodiment, the confidence circuit 317 monitors the success of the prefetches associated with the stream identifier and adjusts the confidence level based on factors e.g. as to whether the prefetched data is used, whether there was a load miss, or whether there was a prefetch evict. In one embodiment, confidence level may have 5 active levels where the highest level is indicative of 4 consecutive prefetch uses (See FIG. 5). In one embodiment, the confidence level is increased with every used data prefetch up to maximum confidence level and decremented with each load miss or prefetch evict. In one embodiment, a confidence level of zero would indicate an unallocated prefetch engine.

In some embodiments, the number of outstanding prefetch addresses allowed by prefetch unit 209 would be dependent upon the confidence level. The higher the confidence level, the more outstanding prefetch addresses would be generated.

Reconciliation circuit 323 is utilized to control the prefetching to ensure that the prefetch addresses are for data that is scheduled to be obtained ahead of its need in the pipelined operations. Reconciliation circuit 323 may be utilized to "synchronize" the prefetch engine (PE) and program accessed regions of the memory. For example, if the prefetch engine runs far ahead of the program, previously prefetch data may be overwritten before used. Reconciliation circuit 323 is utilized to rectify such a situation.

In one embodiment, prefetch unit includes four prefetch engines, but may include other numbers (e.g. 2, 8, 16) in other embodiments.

The select prefetch engine circuit 309 of control unit 301 selects which prefetch engine to obtain a prefetch address to provide to load store unit 207. In one embodiment, select prefetch engine circuit 309 selects the prefetch engine in a round robin pattern and/or based on whether the prefetch engine has a prefetch address available.

Figure 4:
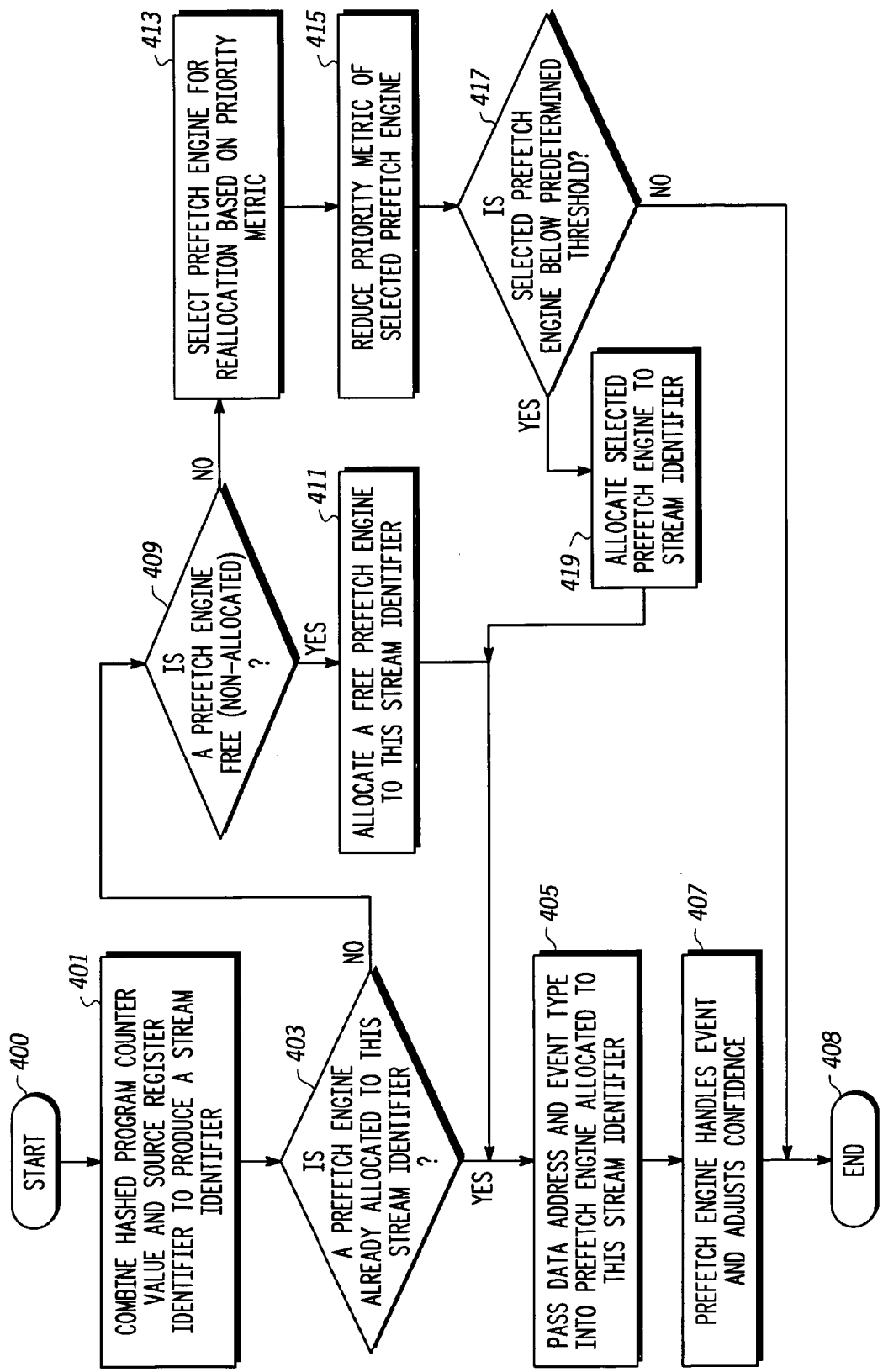
FIG. 4 is a flow diagram for allocating a prefetch engine for stride detection according to one embodiment of the present invention.

FIG. 4 is a flow diagram showing the operations of control unit 301 for de-aliasing and allocating stream identifiers to a prefetch engine according to one embodiment of the present invention.

In 401, de-aliasing circuit 307 produces a stream identifier from the hashed value and the source register identifier (e.g.121 of FIG. 1) for each load instruction or other type of event of the pipeline. In one embodiment, the this stream identifier is eight bits wide with 4 bits from the hashed value of the program counter and 4 from the source register identifier. In one embodiment where the source register identifier field of the op code is 5 bits, the 4 least significant bits are used. However, in other embodiments, other bits of the identifier field may be used as well as other pipelined information to produce the stream identifier. Each stream identifier represents a particular instruction of the processor pipeline.

In 403, de-aliasing circuit 307 determines whether a prefetch engine (e.g. 311, 313) is allocated to the stream identifier. If yes in 403, then de-aliasing circuit 307 passes the information of the event e.g. data address and event type associated with the instruction to the allocated prefetch engine. In 407, the prefetch engine handles the event and adjusts the confidence level accordingly.

In one embodiment, the allocated prefetch engine handles the event by determining whether there was a load hit, a load miss, whether the prefetch was used, or whether the prefetch was evicted. A load hit is where the pipeline requested data is in L1 cache 213 and a load miss is when the pipeline requested data is not in L1 cache 213.

If no in 403, the allocation circuit 305 determines whether there is a non allocated prefetch engine in 409. A non allocated prefetch engine may be an engine that was previously allocated but whose confidence level is below a threshold (e.g. 0). If yes in 409, then allocation circuit 305 allocates a free prefetch engine to the stream identifier and operations 405 and 407 are completed.

If no in 409, then allocation circuit 413 determines whether to reallocate a prefetch engine to the stream identifier. In the embodiment shown, allocation circuit 305 selects a prefetch engine based on the lowest value of a priority metric. In one embodiment, the priority metric is the confidence level as will be discussed below. In other embodiments, other priority metrics may be used including e.g. the least frequently accessed stream identifier or the least recently accessed stream identifier.

In 415, allocation circuit 305 reduces the priority metric of the selected prefetch engine. In one embodiment, circuit 305 reduces the confidence level in operation 415. If in 417, the priority metric (e.g. the confidence level) is below the a predetermined threshold (e.g. the confidence level is zero), the allocation circuit 305 reallocates the selected prefetch engine to the stream identifier in 419 and operations 405 and 407 are performed. If no in 417, the event associated with the stream identifier is ignored.

In other embodiments, upon selecting a prefetch engine with the lowest priority metric, the prefetch engine is automatically reallocated to the stream identifier. However, utilizing a threshold determination (e.g. 417) provides a system where extraneous access "noise" will not de-allocate a prefetch engine properly tracking a strided stream.

In one embodiment, confidence circuit 317 determines the confidence of the prefetching by implementing a confidence level scheme for a stream identifier. In one embodiment, the confidence level is adjusted based on a number of factors such as an indication whether a prefetch was used by the processor (PF used), whether there was a load miss (e.g. whether a load instruction associated with the stream identifier had an address that was not in the L1 cache), and whether the next address generated by the load instruction associated with the stream identifier allocated to the PE is within the detected stride of that strided stream (referred to as a stride hit or stride miss).

In one embodiment, each prefetch unit is able to request multiple prefetches ahead in a detected strided stream (e.g. issue multiple outstanding prefetches). In one embodiment, the ability to issue multiple outstanding prefetches is based on a confidence level.

Figure 5:
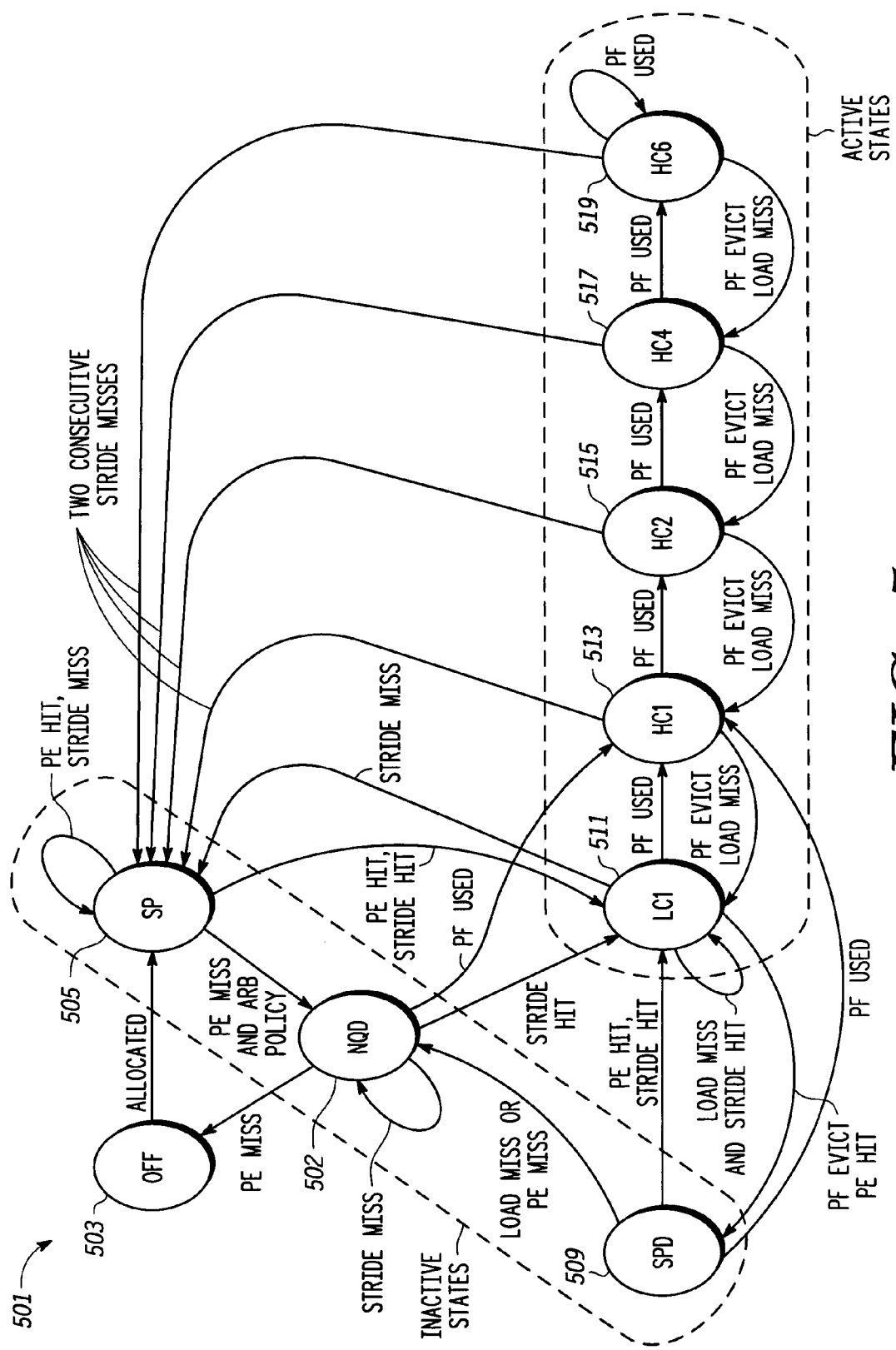
FIG. 5 is a state diagram for a prefetch engine implementing confidence levels according to one embodiment of the present invention.

FIG. 5 shows one embodiment of a state machine 501 of a prefetch engine (e.g. 311) for implementing a confidence level scheme. State machine 501 in FIG. 5 shows one example of how each prefetch engine determines a confidence level and then controls the number of outstanding prefetches based on the confidence level. Other examples may be implemented differently in other embodiments. In one embodiment, the state machine 501 in FIG. 5 is implemented in the circuitry of the confidence circuit (e.g. 317), the reconciliation circuit (e.g. 323), and the detection circuit (e.g. 316) of the prefetch engine.

State machine 501 includes two types of states. SP state 505, NQD state 502, and SPD state 509 are inactive states and low confidence1 (LC1) state 511, high confidence1 (HC1) state 513, HC2 state 515, HC4 state 517, and HC6 state 519 are active states. The prefetch engine can generate prefetch addresses only in the active states.

Initially, each prefetch engine is in OFF state 503. In the OFF state 503, the engine is not allocated to any stream identifier. From state 503, the prefetch engine moves to SP state 505 in response to being allocated to a stream identifier (e.g. as in operation 411). In SP state 505, the confidence level of the stream identifier is zero or at the lowest level.

If in SP state 505, the event received by the de-aliasing circuit 307 is an address associated with the stream identifier (referred to as a PE hit) and the address is a stride miss, then the PE stays in state 505. A stride miss is generated by an instruction associated with the stream identifier having an address separated from its previous address by a difference other than the stride. If the address is a PE hit and a stride hit, then the PE transitions to low confidence LC1 state 511.

In LC1 state 511, the prediction unit of the PE is in a state that it is allowed to have one outstanding prefetch address. Thus, if there are no outstanding prefetches, then the PE will generate a prefetch address. In one embodiment, the prefetch address is computed from the previous address of the strided stream and the stride. In state 511 if there is a load miss and a stride hit, then the PE remains in state 511. In one embodiment, prefetch unit 209 receives an indication of a load miss from load store unit 207 via the event stream. A load miss occurs when a data address of a load instruction associated with the stream identifier is not found in the L1 cache or in LSU 207. Such a condition may indicate that a previous prefetch address was not accurate, the load instruction is not generating (or is no longer generating) addresses of a strided stream.

If in LC1 state 511 there is a prefetch evict (PFevict), then the PE transitions to SPD state 509. A prefetch evict event occurs where LSU 207 obtains the data for a prefetch address in a queue (not shown) of LSU 207 and stores the data in L1 cache 213. The prefetch address is then evicted from the queue of LSU 207 and an indication of a prefetch evict (which includes the PE ID of the prefetch identifier) is placed in the event stream.

In state 509, no prefetch address is generated by the prefetch engine. If in state 509, the next address associated with the stream identifier is a PE hit and a stride hit, then the PE transitions back to state 511. In state 509, if a prefetched address was used (e.g. if processor pipeline accessed the data of the prefetched address in the L1 cache, or in the load store unit 207), which is hereafter designated as a "PF used", then the PE transitions to state 513.

In the embodiment of FIG. 5, states 511, 513, 515, 517, and 519 are active states. In the active states, the PE generates prefetch addresses if the number of outstanding prefetches is less than the allowed number of outstanding prefetches for that state. In the embodiment shown, the prediction unit of the prefetch engine generates prefetch address using the previous address and the stride. Also, in the active states, the PE engine ignores all PE misses.

Each of the active states 511, 513, 515, 517, and 519 represent a successively higher confidence level in the prefetching operation by a PE in the detected stride stream. HC6 state 519 is the highest confidence active state and state 511 is the lowest confidence active state. If a load miss or a PF evict event occurs during one of the active states, the PE transitions to a lower state. If a PF used event occurs, the PE transitions to a higher confidence state. The PE remains in the highest confidence state 519 in response to a PF used event. In the embodiment shown, state machine 501 includes 5 active states, but other embodiments may include a different number of active states and therefore a different number of confidence levels.

In each of active states 511, 513, 515, 517, and 519, the PE transitions back to SP state 505 in response to two consecutive stride misses.

States 509, 502 and 505 are referred to as inactive states in that the PE prediction unit does not generate prefetch addresses in these states. Also in these states, the PE is responsive to a PE miss.

In state 505, the PE transitions to state 502 in response to a PE miss and an arbitration policy decision. In one embodiment, the arbitration policy decision is to select one PE to reduce the confidence level (e.g. from state 505 to state 502). See for example operation 415 of FIG. 4. In one embodiment, this reduction is based on the PE with the lowest confidence level. If two PEs have the same low confidence level, the PE selected for reduction may be on a round robin basis.

In state 509, the PE transitions to NQD state 502 in response to a load miss or a PE miss and arbitration policy decision (see the preceding paragraph). The NQD state 502 is implemented to prevent the prefetch unit from thrashing the reallocation of newly allocated PEs to different stream identifiers. In state 502, the PE transitions to the OFF state 503 in response to a PE miss. In state 502, the PE remains at state 502 in response to a stride miss. In state 502, the PE transitions to state LC1 511 in response to a stride hit.

In the embodiment shown, when in active states 511 and 513, only one outstanding prefetch address is allowed. In these states, the PE waits for confirmation regarding the use of the prefetch address to obtain data before generating additional prefetch addresses. State 515 allows for two outstanding prefetch addresses. Thus in this state, one outstanding prefetch address is used to obtain the next predicted data in the strided stream (next data) and the other outstanding prefetch address is used to obtain the predicted data (located a stride apart) following the next predicted data in strided stream. In state 517, the prediction unit allows for four outstanding prefetch addresses where one outstanding address is used to obtained the next predicted data in the strided stream and the other 3 outstanding addresses are used to get the next three predicted data accesses of the strided stream. In state 519, the prediction unit allows for 6 outstanding prefetch addresses.

When the number outstanding prefetch addresses is below the maximum number of allowable prefetch addresses of the state, the PE generates additional prefetch addresses until the number of outstanding prefetch addresses matches the maximum allowed number. When an indication of a result of a prefetch is received by the PE, the number of outstanding prefetch addresses is decremented.

If the PE transitions to a lower active confidence state from a higher confidence state (e.g. state 515 to state 513), the PE would not generate a prefetch address (e.g. the PE enters a prefetch stall master state) until the number of outstanding prefetches above the maximum allowable number for the lower state are resolved. For example, when transitioning to state 513 from state 515, no prefetch addresses would be generated until the outcome of the last outstanding address is known. If transitioning from state 519 to state 517, then a new address would not be generated until there are only three outstanding prefetch addresses.

The ability to control the number of outstanding prefetch addresses based on a confidence level may enable a data processing system to schedule the acquisition of data for future use while minimizing resources. This minimization of resources is due to the amount of predictive data obtained ahead of its required use in the processor pipeline is based on a likely use of that data. In other embodiments, a greater number of an outstanding prefetch addresses may be allowed for each confidence level state.

In the embodiment shown, state 509 can only be reached from an active state 511. Accordingly, state 509 is an inactive state reached in response to load miss or PF evict from an active state. In state 509, the PE skips state 511 and transitions to state 513 in response to a PF used event. This skipping of state 511 may result in faster gain back of confidence from an inactive state.

In some embodiments, a prefetch engine may generate prefetch addresses that cross the page boundary of a page that includes a current address of the strided stream. In one embodiment, the addresses received by the prefetch unit 209 from the processor pipeline (e.g. 100) via the load store unit 207 are virtual addresses. The prefetch unit also receives physical address (e.g. from MMU 223) via the load store unit and event stream 350 that include translations of the virtual address of the load misses of L1 cache 213. In the embodiment shown, the prediction circuit 321 uses the physical address of the cache miss and stride information of the address data stream to generate a prefetch physical address. Subsequent prefetch physical addresses are generated by prediction circuit 321 using previous prefetch physical address and the stride information.

However, when the predicted prefetch physical address crosses a memory page boundary, the physical address of the next page in memory is unknown to the prefetch engine.

In one embodiment, the prediction unit of the PE generates a request for translation of a virtual address to the translation control circuit 308 in response to a determination that an address boundary is being crossed. In response, translation control circuit 308, when available (e.g. not servicing requests from other PEs), provides the virtual address to the L2 cache MMU 227 for translation.

Figure 6:
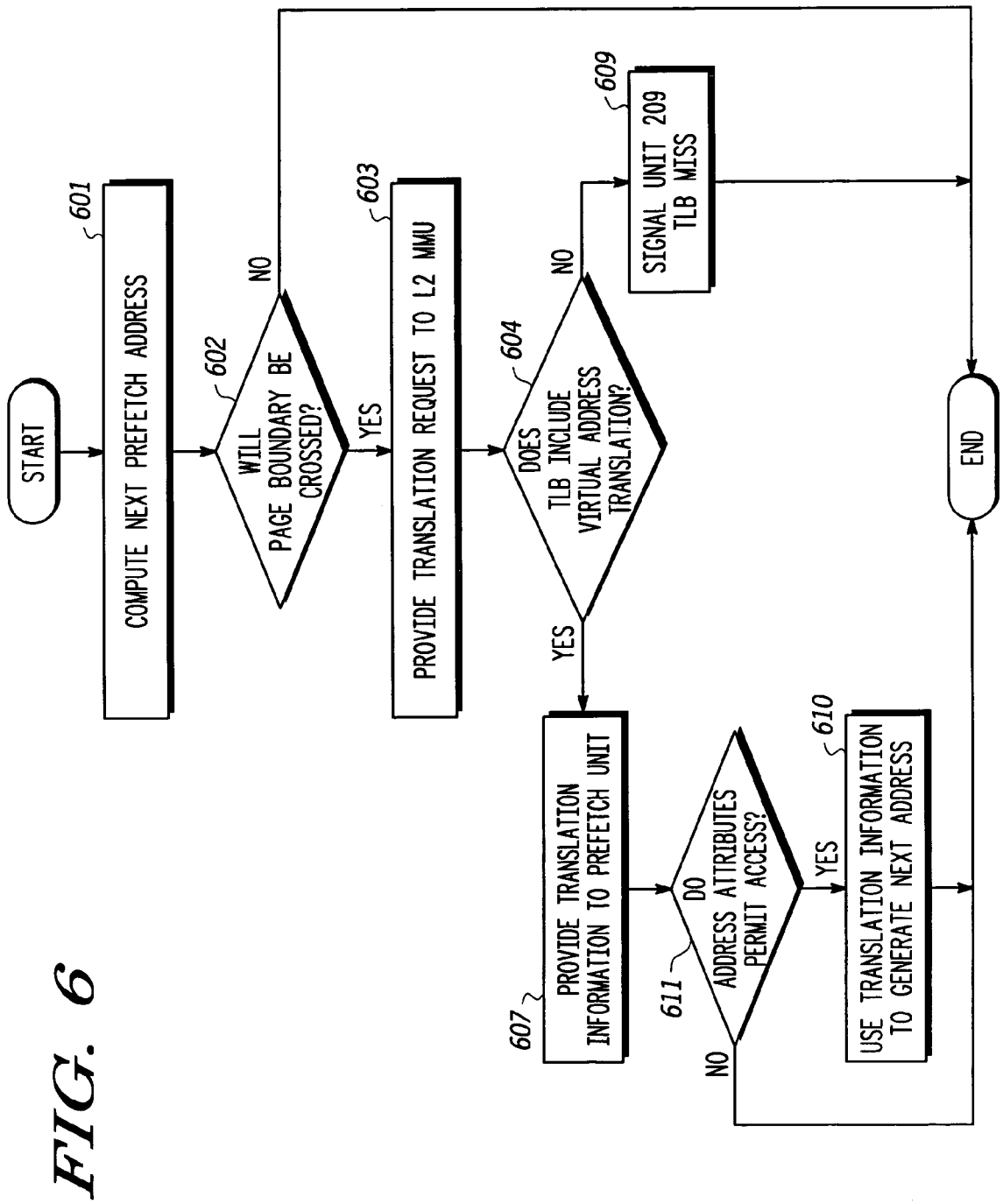
FIG. 6 is a flow diagram for obtaining page boundary information for prefetching according to one embodiment of the present invention.

FIG. 6 is a flow chart of operations of data processing system 201 in obtaining a physical address translation of a request from a prefetch unit. In 601, prediction circuit 321 computes the next prefetch address. In 602, a determination is made by predication circuit 321 of whether the next data address of the strided stream will cross a page boundary. If no in 602, then prediction circuit 321 generates the next prefetch address (physical address) at the appropriate time in that the next prefetch address is known.

If yes in 602, then control circuit 308 provides the translation request (including the virtual address) to MMU 227 for translation in 603. In 604, MMU 227 checks translation lookaside buffer 229 to determine whether it includes an entry for the virtual address of the request. If no in 604, then MMU 227 signals prefetch unit 209 of a TLB miss in 609.

If yes in 604, MU 227 provides the translation information to translation control circuit 308 in 607, which passes the information to the requesting prefetch engine. The prefetch engine makes a determination in 611 of whether access to the next page is permitted based on access attributes in the translation information. Access to a particular memory may be denied if e.g. that page of memory is used by another process. If yes in 611, the prefetch engine utilizes the translation information to generate a prefetch physical address in the next page. The address is provided to LSU 207 via PFQ 210. LSU 207 then retrieves the prefetched data from either L2 cache 211 or memory 221. If no in 611, then a prefetch address is not generated.

If TLB 229 does not include the translation information for the virtual address as determined in 604, then in 609, MMU 227 indicates to the prefetch engine that no translation information exists in 609. In response to the indication that no translation information exists, the allocation circuit 305 de-allocates the prefetch engine from the stream identifier (e.g. by transitioning the state machine to OFF state 503, see FIG. 5) in one embodiment.

The ability to generate prefetch physical address across a page boundary may improve processor pipeline performance by avoiding load misses due to crossing page boundaries.

In some embodiments, the requests for translation information from the prefetch unit 209 are of a lower priority than requests from load store unit 207. Also in some embodiments, the translation information may be obtained from the L1 MMU 223. However, obtaining the information from the L2 MMU 227 does not impede on processor pipeline operations.

In one embodiment, the prefetch engines would not predict addresses from data address streams with strides (e.g. the distance between consecutive addresses of the address data stream) being greater than a predefined distance. In one embodiment, the predefined distance is 512 bytes. In one embodiment, the pages are 4 Kbytes but maybe of other sizes in other embodiments.

In some embodiments, other translation information regarding a virtual address provided to the prefetch unit may include access rights. If the access rights indicate that the page is not accessible, the PE will not generate prefetch address to the restricted area (e.g. and would transition to OFF state 503.

In the embodiments described above, prefetch unit 209 requests translation information from a TLB. However, in other embodiments, translation information may be obtained from other types of translation sources in a data processing system. For example, in other embodiments, the translation information requested by the prefetch unit may be obtained from a page table in memory 221.

In some embodiments, the PE can be dynamically allocated based on software prefetch instructions. In one embodiment, the processor includes a data stream touch instruction that commands the prefetch unit to allocate a PE to a particular instruction.

In some embodiments, each prefetch engine implements a set of master states. Examples of prefetch master states includes as DST (data stream touch) state, a page cross stall master state (for waiting for virtual translation information), a prefetch stall master state (for the condition when the number of outstanding prefetch addresses is greater than the number allowed in an active state (e.g. 511, 513, 515, 517, and 519)), a prefetch active master state (for generating additional outstanding prefetch addresses), and an idle state. In one embodiment, the master states may be integrated with the states of state machine 501 of FIG. 1.

FIGS. 7-10 set forth flow diagrams regarding the operations of the prefetch unit for processing events of the event stream. In one embodiment, these operations are performed by control unit 301 of prefetch unit. In one embodiment, these operations are implemented in hardware of prefetch unit 209. In other embodiments, these may be implemented with a processor unit executing instructions or firmware.

Figure 7:
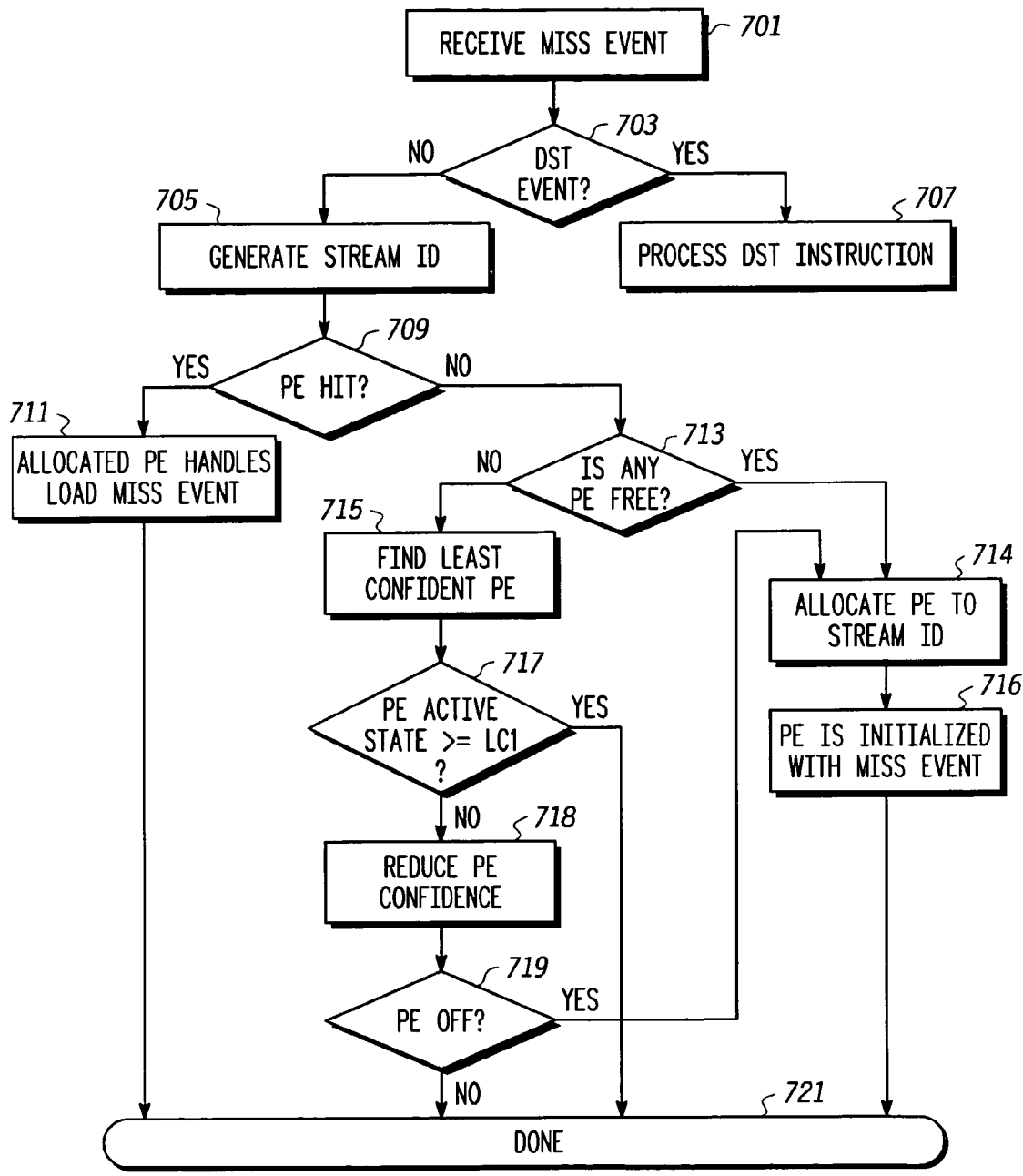
FIGS. 7-16 are flow diagrams setting forth operations for prefetching according to one embodiment of the present invention.

FIG. 7 sets forth the operations for processing an indication of a miss event by the prefetch unit 209. In 701, an indication of a miss event is received by prefetch unit 209 in the event stream. In one embodiment, a miss event occurs when LSU 207 does not find data for a load instruction in L1 cache 213. In 703, the de-aliasing circuit 307 determines whether an indication of a miss event is a DST event. A DST event is a software prefetch instruction. In the embodiment shown, DST events and miss events are indicated in the event stream using the same signal line. In 703, circuit 307 looks at other information in the event stream regarding the event for differentiation of the two events. If in 703 its determined to be a DST event, then in 707, prefetch unit 209 processes the DST instruction by allocating a prefetch engine to handle the prefetch address generation of the DST instruction.

If no in 703, allocation circuit 305 generates a stream identifier in 703. In 709, allocation circuit 305 determines if any prefetch engine is allocated to the stream identifier. If yes (referred to as a PE hit in the state diagram of FIG. 5), the prefetch engine allocated to the stream identifier processes the event in 711. See FIG. 11. If no in 709 (referred to as a PE miss), allocation circuit 305 determines whether any prefetch engine is free (non allocated). If there is a free prefetch engine in 713, circuit 305 allocates the free prefetch engine to the stream identifier and in 714, the allocated prefetch engine is initialized with the miss event in 716.

If no in 713, allocation circuit 305 finds the prefetch engine with the lowest confidence level in 715. If two prefetch engines are tied with the same lowest confidence level, a tie breaking mechanism is used (e.g. round robin or one with lower identifier). If yes in 717 (the selected PC is in an active state that is greater than or equal to the low confidence state (LC1) (see state 511 of FIG. 5)), then the miss will be ignored. If no in 717, the PE confidence level is reduced (e.g. see the "PE miss" transition event of FIG. 5) in 718. If the confidence level is reduce to the OFF state (state 503 in FIG. 5) in 718, then the stream identifier is allocated to the prefetch engine in 714. If no in 719 (the PE transitions to NQD state 502 of FIG. 5), the event is ignored. Note a prefetch engines in an active state (a state greater than or equal to LC1 511) is not affected by PE misses.

Figure 8:
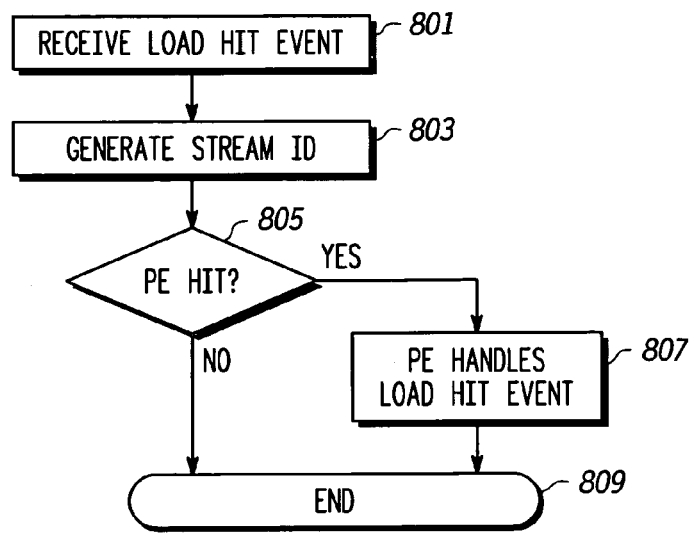

FIG. 8 sets forth a flow diagram of the prefetch unit for processing an indication of a load hit from the event stream. In one embodiment, a load hit occurs when LSU 207 finds requested data from a load instruction in the L1 cache 213. In 801, de-aliasing circuit 307 receives an indication of a load hit from the event stream and in 803 generates a stream identifier. A determination is made in 805 whether the stream identifier is allocated to a PE (PE hit). If yes in 805, the allocated PE handles the load hit event in 807 (see FIG. 13). If no in 805, the load hit is ignored.

Figure 9:
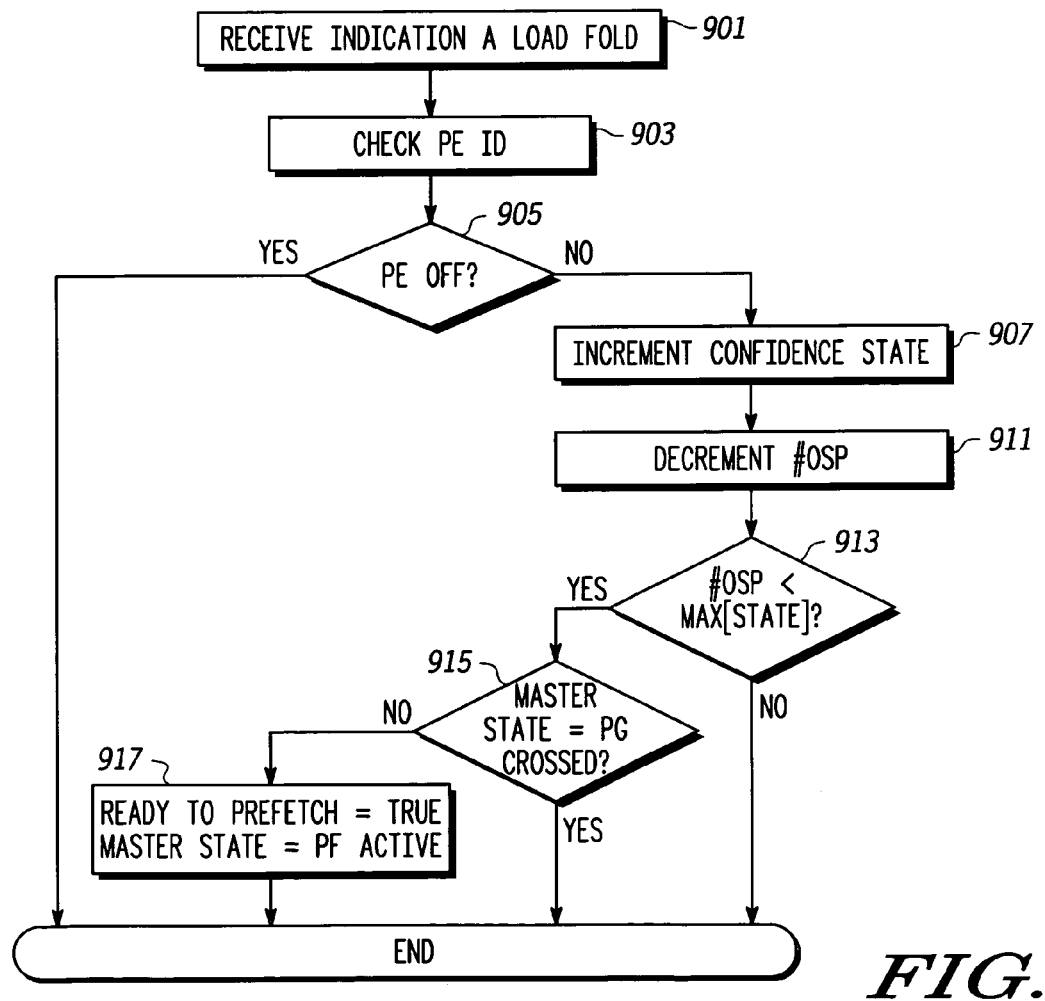

FIG. 9 sets forth a flow diagram for processing an indication of a "load fold" on the prefetch from the event stream by prefetch unit 209. In one embodiment, load store unit 207 receives prefetch addresses from prefetch unit 209 and places them in a prefetch address queue (not shown) of LSU 207 for servicing. When LSU 207 obtains the data of the prefetch from either the L2 cache 211 or memory 221 via BIU 212, the prefetched data is stored in L1 cache 211 and the prefetch address is evicted from the prefetch address queue of LSU 207 (referred to as a prefetch evict). A load fold event occurs when a load instruction from the processor pipeline requests data that is being requested by a prefetch address in the prefetch address queue of the LSU 207. In response to such a condition, the prefetch address of the load fold is removed from the prefetch address queue of the LSU 207 when the data is obtained by LSU 207 and the LSU 207 generates an indication of a load fold event in the event stream.

In 901, de-aliasing circuit 307 receives an indication of a load fold event. This indication includes a prefetch engine identifier (PE ID) that is unique to each prefetch engine of prefetch unit 209. When prefetch unit 209 generates a prefetch address, the prefetch engine identifier accompanies the prefetch address in PFQ 210 and in LSU 207. In 903, the PE ID is checked to determine the PE that generated the address of the load fold. In 905, if the prefetch engine of the PE ID is in the OFF state (state 503 of FIG. 5), then the load fold event is ignored. If no in 905 (referred to as a PF used in the state diagram of FIG. 5), the confidence level state for the prefetch engine is incremented (see FIG. 5) and the number outstanding prefetches is decremented in 911. In 913, a determination is made whether the number of outstanding prefetches is less than the maximum allowed in the confidence level state (e.g. states 511 and 513 allow a maximum of one OSP, 515 allows a maximum of 2 OSPs, state 517 allows a maximum of 4 OSPs, and state 519 allows a maximum of 6 OSPs). If the number of OSPs is greater than the maximum allowed, then no new prefetch addresses are generated.

If in 913, the number of OSPs is less than the maximum allowed, in 915 a determination is made whether the prefetch engine is in a page cross stall master state (PG cross). In the page cross stall master state, no further action is taken in that the prefetch engine is awaiting a translation of a virtual address from the L2 MMU 227. See the discussion above with respect to FIG. 6.

If no in 915, the ready to prefetch flag for the prefetch engine is set in 917 to indicate to select prefetch engine circuit 309 that the prefetch engine is ready to generate prefetch addresses. Also, in 917, the master state of the prefetch engine is set to prefetch active.

Figure 10:
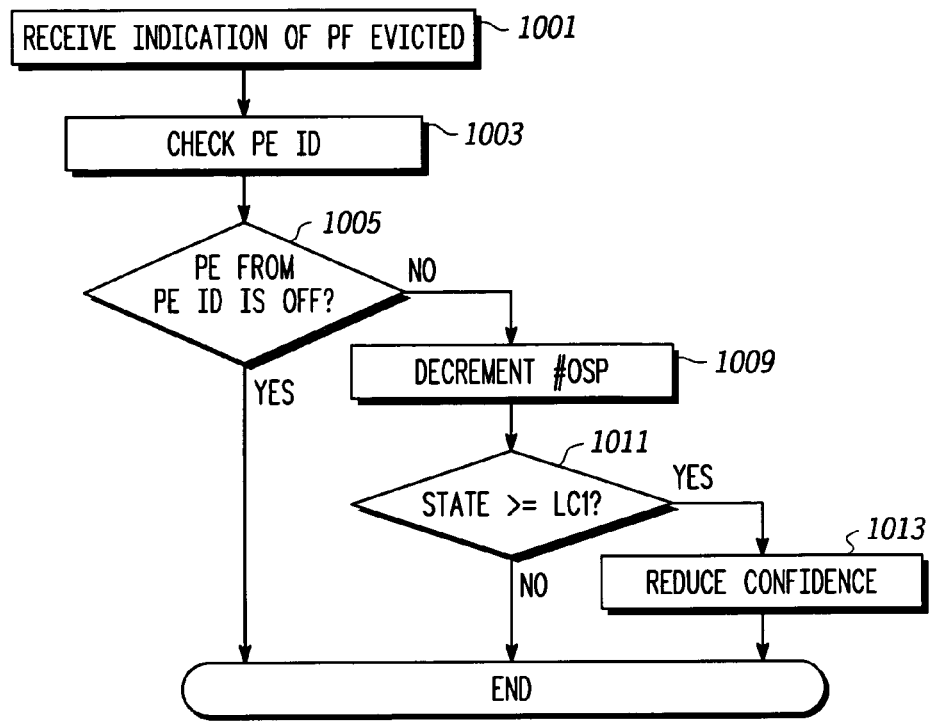

FIG. 10 sets forth a flow diagram for processing an indication of a "prefetch evict" event from the event stream by prefetch unit 209. In 1001, de-aliasing circuit 307 receives an indication of a PF evicted event. In 1003, circuit 307 checks the PE ID of the event. In 1007, a determination is made whether the prefetch engine of the PE ID is in the OFF state (e.g. 503). If yes in 1005, the event is ignored. If no in 1005, then in 1009, the number of outstanding prefetches in reduced in 1009.

In 1011 a determination is made whether the confidence level state is greater than or equal to LC1 511 (see FIG. 5). If so, then the confidence level is reduced (see the PF evict" in FIG. 5) in 1013. The purpose of reducing confidence due to a prefetch evict is to limit the amount of prefetched data in the L1 cache that is not being used. A prefetch evict event only means that the prefetched data was obtained by the LSU 207 and not that it was used for pipelined processor operations. If no in 1011, then no further action is taken.

Figure 11:
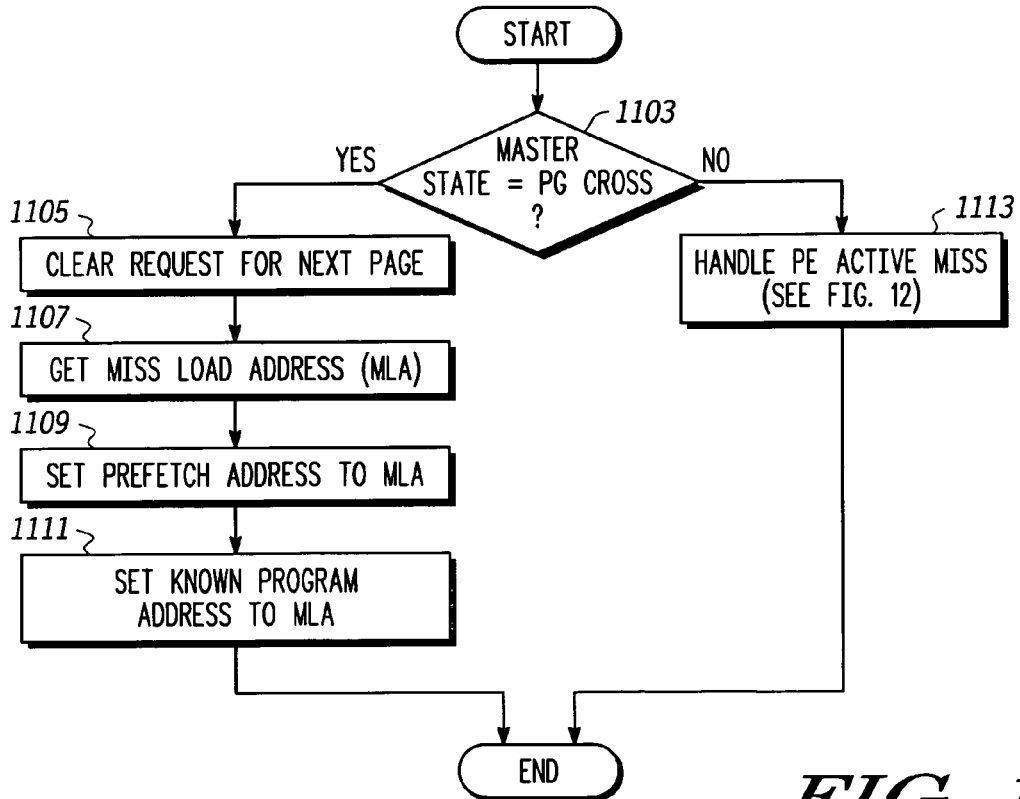

FIG. 11 is a flow diagram showing one embodiment of the operations of a prefetch engine in handling a load miss event of operation 711 in FIG. 7. In 1103, determination is made whether the prefetch engine is an a page cross stall master state or not. The PE is in a page cross stall master state when it is waiting for a translated physical address of a virtual address provided to the LSU due to a page crossing. If yes in 1103, then in 1105, the PE clears the request for the next page in that the next page physical address is assumed contained in the load miss. Thus, the next page physical address is no longer needed because it was provided by the load miss. In 1107, the load address (physical address) of the miss event (miss load address (MLA)) is obtained from the indication of the miss. In 1109, the address that is used to calculate the next prefetch address (the address that the stride is added to) is set to the MLA in 1109. In 1111, the known program address (KPA) is set to the MLA. See FIG. 14 regarding further discussion of the known program address (KPA). If no in 1103, the prefetch engine handles the load miss in the prefetch stall master state or the prefetch active master state in operation 1113 (See FIG. 11).

Figure 12:
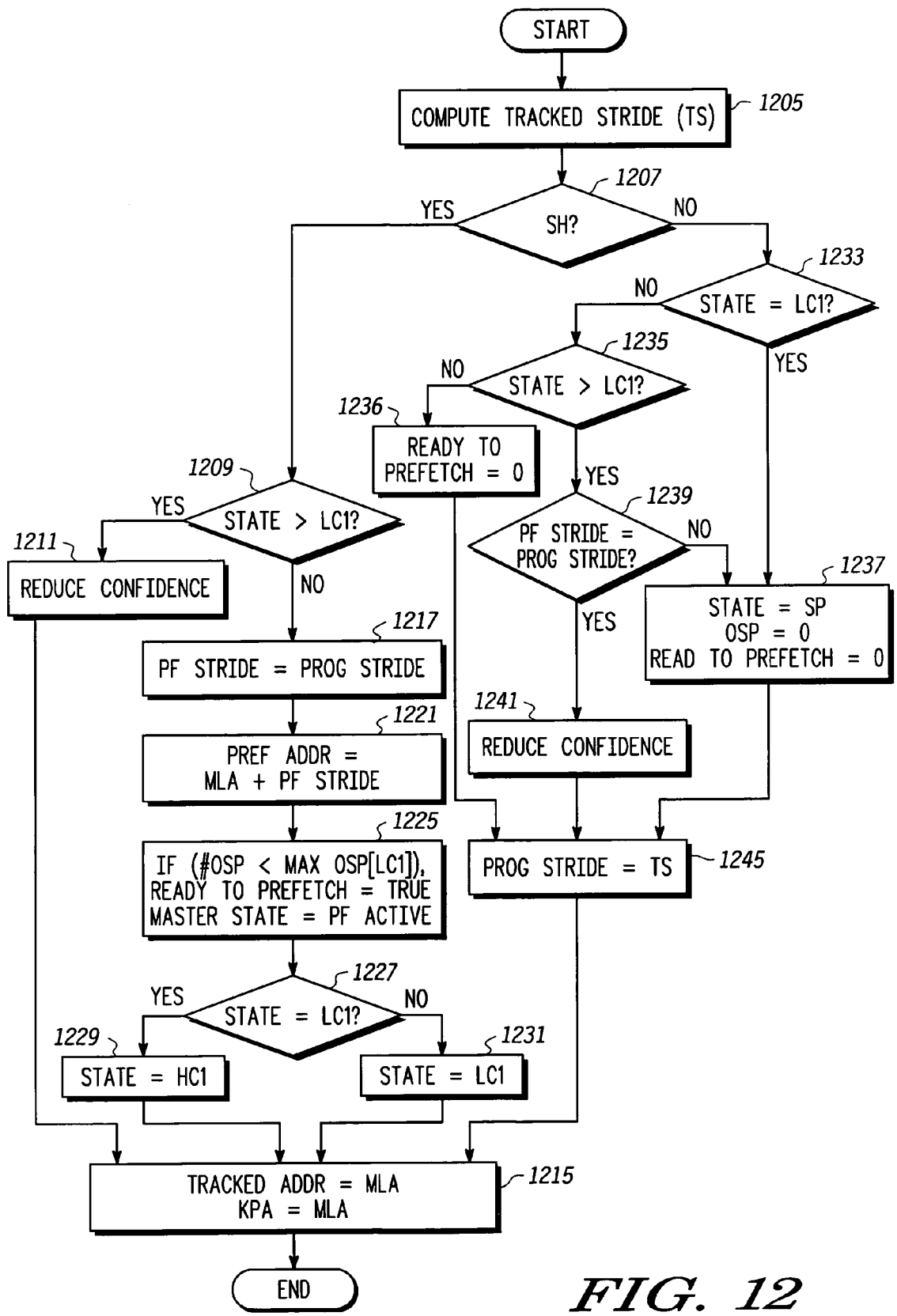

FIG. 12 sets forth a flow chart of operation of operation 1113 of FIG. 11 where the prefetch engine handles a load miss in an active master state (prefetch stall or prefetch active). In 1205, a track stride (TS) is calculated. In one embodiment, the tracked stride is calculated by subtracting an address (tracked address) from the address of the miss load address MLA. The tracked address is the address of the previous missed load.

In 1207 a determination is made whether a stride hit has occurred. In one embodiment, a stride hit occurs when the tracked stride calculated in 1205 is equal to the program stride. The program stride is the stride that has been recently calculated, or for a newly allocated prefetch engine, it is an estimated stride. If a stride hit is determined in 1207, then a determination is made in 1209 whether the confidence state is greater than state LC1 511. If the confidence state level is above LC1 state 511 (e.g. state 513, state 515, state 517, or state 519), then the confidence state level is reduced in 1211 and the tracked address becomes the MLA in 1215. Also, in 1215, the known program address (KPA) becomes the MLA.

If no in 1209, then in 1217, the prefetch stride is set to the program stride. The prefetch stride is the stride used by the prediction circuit 321 to calculate the next prefetch address from the previous prefetch address. Accordingly in 1221, the prefetch address is calculated by adding the MLA to the prefetch stride. In 1225, if the outstanding prefetch (OSP) is less than the maximum number of outstanding prefetches, then the ready to prefetch flag is set to true and the master state of the prefetch is set to prefetch active.

In 1227, a determination is made whether the confidence state level is LC1. If yes in 1227, then the confidence level is moved up to HC1 in 1229. If no in 1227, the confidence level is set to LC1 511. Afterwards, operation 1215 is preformed.

If no in 1207 (a stride miss), a determination is made whether the confidence state level is LC1 state 511. If yes in 1233, then in the confidence state is moved to SP state 505, the OSP is reset to zero, and the ready to prefetch flag is set to false in 1237. Afterwards, the program stride is set to the tracked stride in 1245.

If no in 1233, then in 1235 a determination is made whether the confidence state is greater than LC1. If yes in 1235, a determination is made in 1239 wherein the prefetch stride is the program stride. If no in 1139, then operations 1237 and 1245 are performed. If yes in 1239, then the confidence state is reduced in 1241 and operation 1245 is performed. If no in 1235, then in 1236, the ready to prefetch flag is set to false and operation 1245 is performed. Afterwards, operation 1215 is performed.

Figure 13:
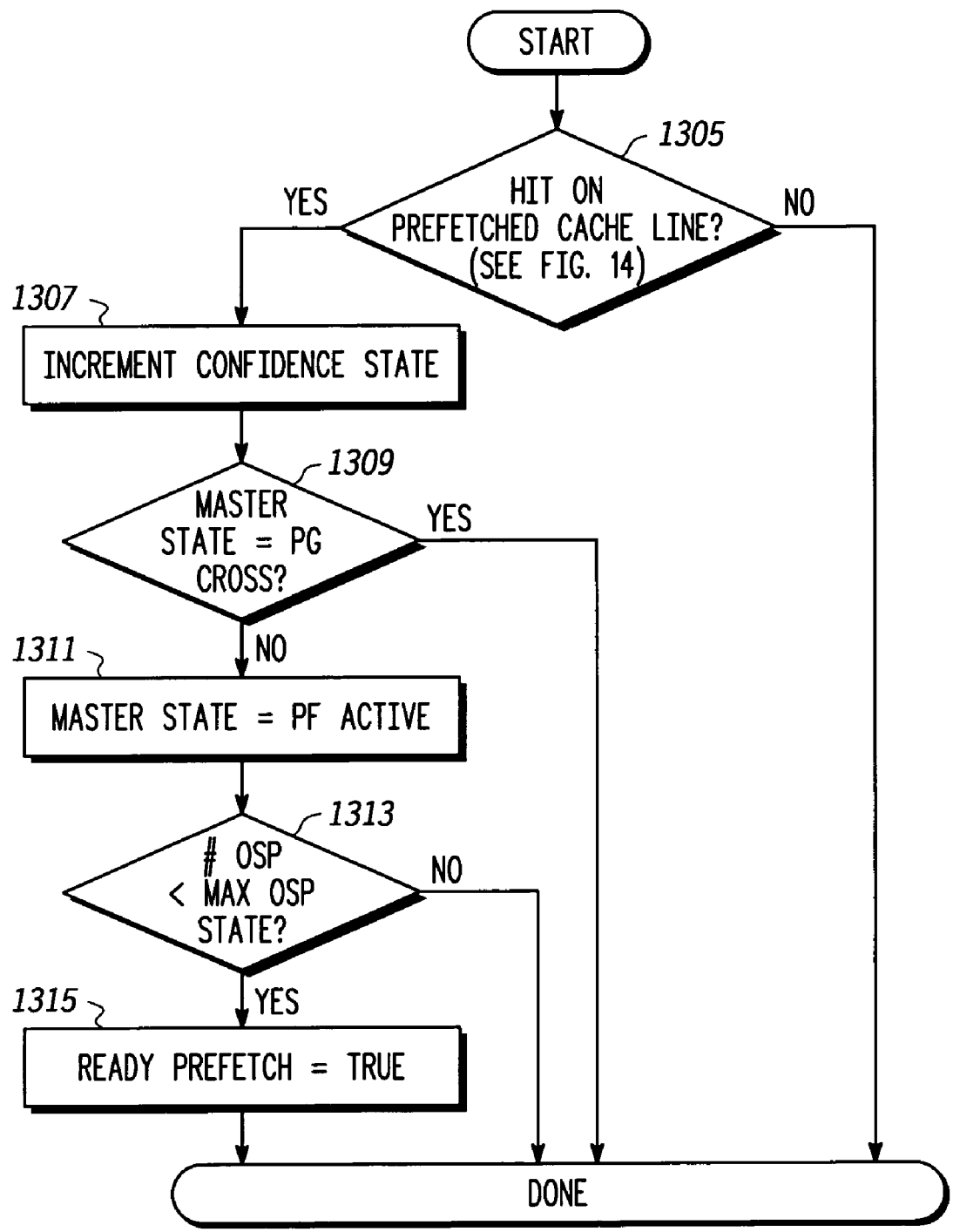

FIG. 13 sets forth an example of operations for prefetching operation 807 of FIG. 8 wherein the prefetch unit handles a load hit event. In 1305, a determination is made whether the load hit was on a prefetched cache line. A further explanation of this determination is set forth in FIG. 14 and the associated text. If yes in 1305, then the confident level state is incremented in 1307 (referred to as a PF used event in FIG. 5). If in 1309, the prefetch engine is in the page cross stall (PG cross)

master state, then no further action is taken. If no in 1309, then in 1311, the master state is set to a prefetch active master state (e.g. prefetch active or prefetch stall). If the OSP is less than the maximum number of allowable prefetches, then the ready to prefetch flag is set to true in 1315 wherein the prediction circuit 321 generates prefetch addresses in the prefetch active master state. If no 1313, the prefetch engine is in the prefetch stall master state where no further action is preformed.

Figure 14:
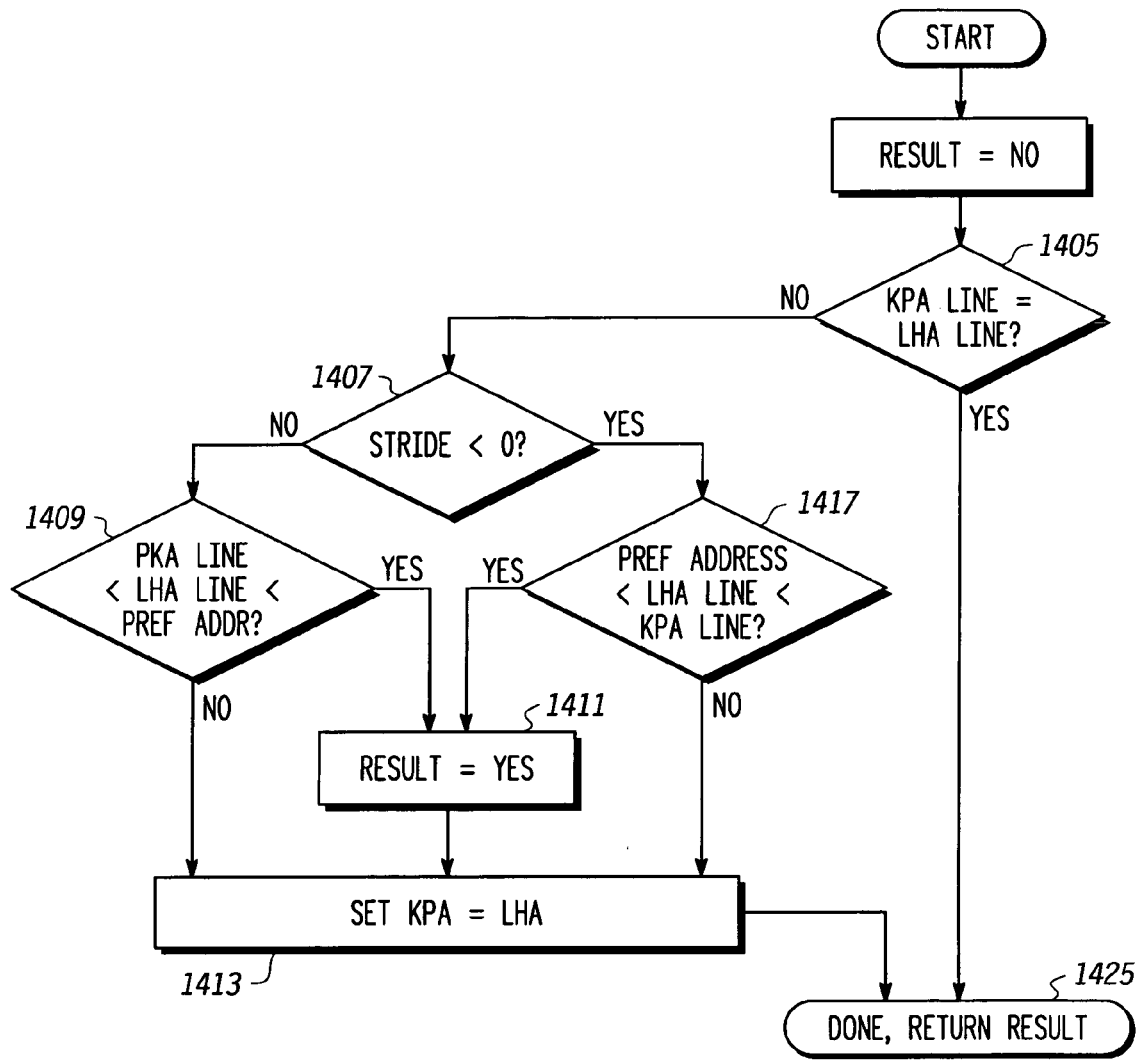

FIG. 14 sets forth a flow diagram of how the determination of whether a load hit in the L1 cache is to a prefetched cache line. In one embodiment, the LSU 207 does not make a determination of whether a load hit was to data that was prefetched. Accordingly, the prefetch engine in these embodiments must make such a determination based on information in the event stream and the state of the prefetch engine.

In the embodiment shown, a determination of whether a load hit was to a prefetched line is made by examining whether the load hit address is between the line of the last known program address (either a previous load hit address or previous load miss) (KPA line) and the line of the latest prefetch address. If the load hit address is in between the KPA line and the line of the latest prefetch address, then it is assumed that the load hit was to a prefetched line of data in the cache. If the load hit address is outside the boundary, then its assumed that the load hit was not to a prefetched line of data in the cache.

Providing a determination such as that set forth in FIG. 14 enables a determination of whether a prefetch was used without an extra flag to be included in the L1cache to store such information and without the use of an extra bit line to convey the information to the prefetch engine. However, in other embodiments, an L1 cache may include extra bits to convey such information.

In 1403, the result of the determination is initially set to no. In 1405, a determination is made whether the KPA line is equal to the load hit address line. If yes in 1405, then in result remains no. If no in 1405, then a determination is made in 1407 whether the stride is less than zero. In the embodiment described, the prefetch engines are able to detect and predict positive and negative strided streams. Accordingly, decision 1407 is utilized. If no in 1407 (the strided stream is positive), then a determination is made in 1409 whether the load hit address line is between the KPA line and the latest prefetch address. In one embodiment, this comparison is made by comparing the load hit address line with the latest prefetch address on a cache line granularity basis. If yes in 1409, the result is set to yes (meaning that its prefetch hit) in 1411 and in 1413, the KPA is set to the load hit address (LHA). If no in 1409, then the KPA is set to LHA and a no is returned.

If yes in 1407, then a determination is made whether the LHA line is between the latest prefetched address (on a cache line granularity) and the KPA line in 1417. if yes in 1417, then in 1411, the result is set to yes, and the KPA is set to LHA in 1413. If no in 1417, the KPA is set to the LHA and a "no" is returned in 1425

Figure 15:
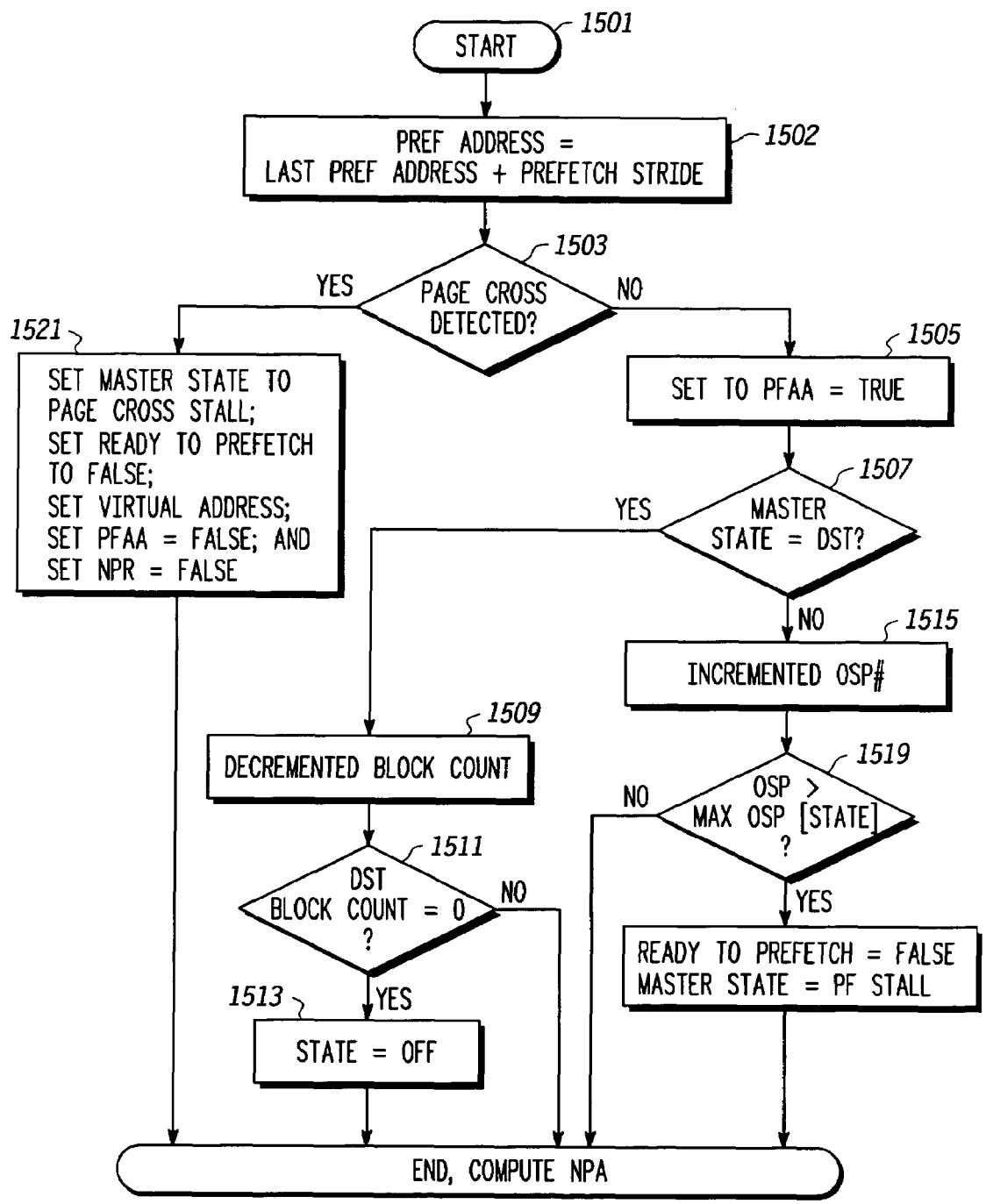

FIG. 15 is a flow diagram setting forth one embodiment for computing a prefetch address by a prefetch engine. In 1502, the prefetch engine computes the next prefetch address by adding the prefetch stride to the last prefetch address. In 1503, a determination is made whether a page boundary is crossed. If no in 1503, then in 1505, the prefetch address available flag is set to true (PFAA=true) in 1505. When the PFAA is set to true, the select prefetch engine circuit 309 will forward the new prefetch address to the PFQ 210.

In 1507, a determination is made whether the prefetch engine is executing a prefetch DST instruction (prefetch engine in a DST master state). If yes in 1507, the prefetch engine will decrement a block count in 1509. If the DST block count is determined to be zero in 1511, then the confidence level state is set to OFF state 503 in 1513 and the prefetch engine is de-allocated.

If no in 1507, the number of outstanding prefetches is increased by one in 1515. If the number of OSPs is greater than the allowed number for a confidence level state as determined in 1519, then the ready to prefetch flag is set to false and the master state of the prefetch engine transitions to a prefetch stall master state (PF stall) in 1521. If no in 1519, then no further processing is performed.

If a page crossing is detected in 1503, the master state of the prefetch engine is set to page cross stall master state in 1521. Also, the ready to prefetch flag is set to false. Further in 1521, the virtual address is set and the PFAA is set to false. Furthermore, the next page requested flag (NPR) is set to false.

Figure 16:
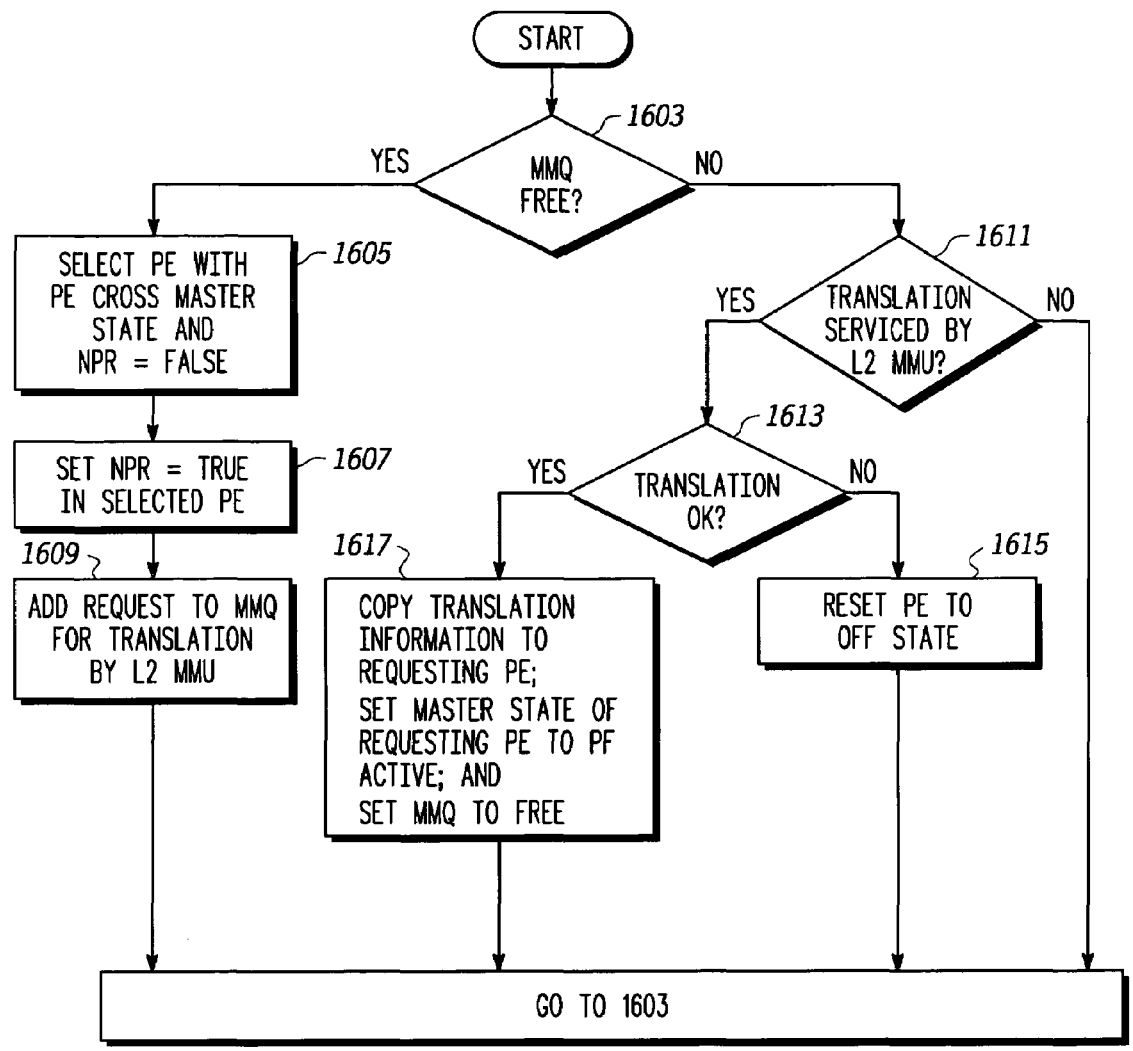

FIG. 16 sets forth a flow diagram showing the operations for generating a request for page translation to the L2 MMU 223 when a prefetch address crosses a page boundary. In one embodiment, the translation operations of FIG. 16 are performed by the translation control circuit 308. In 1603, a determination is made whether the memory management queue MMQ 341 of the control circuit 308 is free. See FIG. 3. MMQ 341 is a queue that stores address translation requests to the L2 MMU 227. In one embodiment, the MMQ 341 being free means that there are no pending address translation requests. If the MMQ is free 1603, in 1605, control circuit 308 selects the PE that is in a page cross stall master state and the NPR flag is false. In 1607, the NPR flag for the selected PE is set to true. In 1609, the request is added to MMQ and control circuit 308 goes back to 1603. When a request is in the MMQ, the request is handled by L2 MMU 227 according to an arbitration policy. In some embodiments, the translation request by the prefetch unit is given a lower priority than other requests in the LSU 207.

If the MMQ is not free in 1603, then a determination is made in 1611 of whether the translation has been serviced by the L2 MMU 227. If no in 1611, control circuit 308 goes back to 1603 until the translation is determined to be serviced in 1611. If yes in 1611, there is a determination of whether the translation is successful (translation ok) in 1603. If the translation was not successful (e.g. the virtual address was not in the L2 MMU TLB 229), then the selected PE is reset to the OFF state 503 in 1615. Control circuit 308 then goes back to 1603.

If in 1613 the translation was performed, then in 1617, the translation information is provided to the requesting prefetch engine (PE), the master state of the requesting PE is set to prefetch (PF) active, and the MMQ is set to free. Translation control circuit 308 then goes back to 1603 to handle the next translation request.

In one embodiment, the operations of FIGS. 11-16 are implemented in hardware of prefetch unit 209. In other embodiments, these may be implemented with a processor unit executing instructions or firmware. A prefetch unit may operate according to other flows in other embodiments.

The techniques and circuitry described above are described as used for data prefetching in a data processing system. However, such hashed values may be used in other types of prefetching such as e.g. instruction fetching in a data processing system.

In one embodiment, a method for prefetching in a data processing system includes hashing a program counter value to produce a hashed program counter value, wherein the hashed program counter value has fewer bits than the program counter value. The method also includes using the hashed program counter value for data prefetching in the data processing system. In a further embodiment, the step of using the hashed program counter value for data prefetching in the data processing system includes using the hashed program counter value to determine a stream identifier and using the stream identifier for prefetching in the data processing system. In a further embodiment, the step of using the hashed program counter value to determine a stream identifier includes combining the hashed program counter value and a second value to produce the stream identifier. In a further embodiment, the second value comprises a register identifier. In a further embodiment, the register identifier comprises a source register identifier. In a further embodiment, the step of combining includes performing at least one of a group consisting of a logic operation and an arithmetic operation using the hashed program counter value as a first operand and using the second value as a second operand. In a further embodiment, the method includes propagating the hashed program counter value through a plurality of processor pipeline stages. In a further embodiment, the step of using the hashed program counter value for prefetching in the data processing system includes using the hashed program counter value to determine if an instruction associated with the hashed program counter value has been allocated to a prefetch engine. In a further embodiment, the hashed program counter value comprises four consecutive bits of the program counter value. In a further embodiment, the step of using the hashed program counter value for data prefetching further includes using the hashed program counter value for strided stream detection in a data address stream of a processor pipeline. In the further embodiment, the method includes using the detection of a strided stream to generate a prefetch address. In a further embodiment, the method includes allocating a plurality of prefetch engines to detect strided streams in an address stream. The step of using the hashed program counter value for prefetching in the data processing system includes determining whether an instruction associated with the hashed program counter value is allocated to a prefetch engine of the plurality of prefetch engines. In a further embodiment, the step of using the hashed program counter value for prefetching in the data processing system includes using the hashed program counter value to identify a load instruction in a processor pipeline for detection of a strided stream in an address stream. In a further embodiment, the step of using the hashed program counter value for prefetching in the data processing system includes using the hashed program counter value to identify whether a load instruction associated with the hashed program counter value has an address that is part of a strided stream in an address stream. In a further embodiment, the step of using the hashed program counter value for prefetching in the data processing system further includes using the hashed program counter value in prefetch address generation. In a further embodiment, the step of prefetching comprises data prefetching.

In another embodiment, a data processing system includes a program counter circuit. The program counter circuit providing a program counter value. The data processing system also includes hashing circuitry, coupled to the program counter circuit, the hashing circuitry hashing the program counter value to produce a hashed program counter value. The hashed program counter value has fewer bits than the program counter value. The data processing system also includes a stage of a processor pipeline coupled to the hashing circuitry. The stage of the processor pipeline receiving the hashed program counter value. The data processing system also includes a second stage of the processor pipeline, coupled to the stage of the processor pipeline. The second stage of the processor pipeline receives the hashed program counter value via the stage. The data processing system also includes detection circuitry, coupled to the stage and the second stage of the processor pipeline. The detection circuitry uses the hashed program counter value received via the stage and the second stage in performing strided stream detection. In a further embodiment, the stage of the processor pipeline is used for instruction fetching and the second stage of the processor pipeline is used for instruction execution.

Another embodiment includes a method for pipelining in a data processing system. The data processing system includes a processor pipeline with a plurality of pipeline stages. The method includes deriving a value from a program counter to produce a derived program counter value and propagating the derived program counter value through at least one of the plurality of pipeline stages. In a further embodiment, the method includes propagating the derived program counter value through a second one of the plurality of pipeline stages. In a further embodiment, the method includes propagating the derived program counter value through more than half of the plurality of pipeline stages until a predetermined pipeline stage is reached. In a further embodiment, the method includes propagating a second value through at least more than half of the plurality of pipeline stages until the predetermined pipeline stage is reached, combining the derived program counter value and the second value to produce a stream identifier, and using the stream identifier for prefetching in the data processing system.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

The invention claimed is:

1. A method for prefetching in a data processing system, the method comprising:
    hashing a program counter value to produce a hashed program counter value, wherein the hashed program counter value has fewer bits than the program counter value;
    propagating the hashed program counter value through a plurality of processor pipeline stages of a processor pipeline;
    using the hashed program counter value for data prefetching in the data processing system, wherein the step of using the hashed program counter value for data prefetching in the data processing system comprises:
        using the hashed program counter value to determine a stream identifier; and
        using the stream identifier for prefetching in the data processing system;
        wherein the step of using the hashed program counter value for data prefetching further includes using the hashed program counter value for strided stream detection in a data address stream of the processor pipeline.

2. A method of claim 1, wherein the step of using the hashed program counter value to determine a stream identifier comprises:
    combining the hashed program counter value and a second value to produce the stream identifier.

3. A method of claim 2, wherein the second value comprises a register identifier.

4. A method of claim 3, wherein the register identifier comprises a source register identifier.

5. A method of claim 2, wherein the step of combining comprises:
performing at least one of a group consisting of a logic operation and an arithmetic operation using the hashed program counter value as a first operand and using the second value as a second operand.

6. A method of claim 1, wherein the step of using the hashed program counter value for prefetching in the data processing system comprises:
using the hashed program counter value to determine if an instruction associated with the hashed program counter value has been allocated to a prefetch engine.

7. A method of claim 1, wherein the hashed program counter value comprises four consecutive bits of the program counter value.

8. The method of claim 1, further comprising:
using the detection of a strided stream to generate a prefetch address.

9. The method of claim 1 further comprising:
allocating a plurality of prefetch engines to detect strided streams in an address stream;
wherein the step of using the hashed program counter value for prefetching in the data processing system includes determining whether an instruction associated with the hashed program counter value is allocated to a prefetch engine of the plurality of prefetch engines.

10. The method of claim 1 wherein the step of using the hashed program counter value for prefetching in the data processing system includes using the hashed program counter value to identify a load instruction in the processor pipeline for detection of a strided stream in the address stream.

11. The method of claim 1 wherein the step of using the hashed program counter value for prefetching in the data processing system includes using the hashed program counter value to identify whether a load instruction associated with the hashed program counter value has an address that is part of a strided stream in the address stream.

12. The method of claim 1 wherein the step of using the hashed program counter value for prefetching in the data processing system further includes using the hashed program counter value in prefetch address generation.

13. The method of claim 1 wherein the step of prefetching comprises data prefetching.

14. The method of claim 1 wherein the plurality of processor pipeline stages includes an execute stage.

15. The method of claim 1 wherein the plurality of processor pipeline stages includes a decode stage.

16. The method of claim 1 wherein the plurality of processor pipeline stages includes a fetch stage.

17. The method of claim 2 further comprising:
propagating the second value through more than one processor pipeline stage of the processor pipeline.

18. A data processing system, comprising:
a program counter circuit, the program counter circuit providing a program counter value;
hashing circuitry, coupled to the program counter circuit, the hashing circuitry hashing the program counter value to produce a hashed program counter value, wherein the hashed program counter value has fewer bits than the program counter value;
a stage of a processor pipeline coupled to the hashing circuitry, the stage of the processor pipeline is used for instruction fetching, the stage of the processor pipeline receiving the hashed program counter value;
a second stage of the processor pipeline, coupled to the stage of the processor pipeline, the second stage of the processor pipeline is used for instruction execution, the second stage of the processor pipeline receiving the hashed program counter value via the stage; and
detection circuitry, coupled to the stage and the second stage of the processor pipeline, the detection circuitry using the hashed program counter value received via the stage and the second stage for stream identification in performing strided stream detection.

19. A data processing system of claim 18, further comprising a third stage of the processor pipeline coupled to the stage and the second stage, the third stage used for instruction decoding, the third stage of the processor pipeline receiving the hashed program counter value via the stage, the second stage of the processor pipeline receiving the hashed program counter value via the stage and the third stage.

20. A method for pipelining in a data processing system, the data processing system including a processor pipeline with a plurality of pipeline stages, the method comprising:
deriving a value from a program counter to produce a derived program counter value;
propagating the derived program counter value through at least one of the plurality of pipeline stages wherein the at least one stage includes a decode stage;
propagating a second value through at least one of the plurality of pipeline stages until the predetermined pipeline stage is reached;
propagating the derived program counter value through a second one of the plurality of pipeline stages, wherein the second one is characterized as an execution stage;
combining, after the propagating the derived program counter value and the propagating the second value, the derived program counter value and the second value to produce a stream identifier;
using the stream identifier for stream identification for prefetching in the data processing system.

21. A method of claim 20, comprising:
propagating the derived program counter value through a fetch stage of the plurality of pipeline stages.

22. A method of claim 20, comprising:
propagating the derived program counter value through more than half of the plurality of pipeline stages until a predetermined pipeline stage is reached.

23. A method of claim 20, wherein the derived program counter value has fewer bits than the program counter.

24. A method of claim 20, comprising:
propagating the second value through more than half of the plurality of pipeline stages until a predetermined pipeline stage is reached.

25. A method of claim 20 wherein the step of using the derived program counter value for prefetching further includes using the derived program counter value for strided stream detection in a data address stream of the processor pipeline.

* * * * *